(12) United States Patent
Shekhar et al.

(10) Patent No.: US 10,243,834 B1
(45) Date of Patent: Mar. 26, 2019

(54) INTERCONNECTING VIRTUAL NETWORKS USING AN ETHERNET VIRTUAL PRIVATE NETWORK (EVPN) AND VIRTUAL EXTENSIBLE LOCAL AREA NETWORK (VXLAN) BASED OVERLAY NETWORK

(71) Applicant: Juniper Networks, Inc., Sunnyvale, CA (US)

(72) Inventors: Ravi Shekhar, Sunnyvale, CA (US); Anil K. Lohiya, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 17 days.

(21) Appl. No.: 14/602,592

(22) Filed: Jan. 22, 2015

(51) Int. Cl.
*H04L 12/755* (2013.01)
*H04L 12/741* (2013.01)
*H04L 12/931* (2013.01)
*H04L 12/933* (2013.01)

(52) U.S. Cl.
CPC .......... *H04L 45/021* (2013.01); *H04L 45/74* (2013.01); *H04L 49/15* (2013.01); *H04L 49/354* (2013.01)

(58) Field of Classification Search
CPC .................................................. G06F 9/45533
See application file for complete search history.

(56) References Cited

U.S. PATENT DOCUMENTS

| | | | |
|---|---|---|---|
| 9,391,796 B1* | 7/2016 | Shekhar | H04L 12/40013 |
| 2011/0286452 A1* | 11/2011 | Balus | H04L 12/4641 370/390 |
| 2014/0092907 A1* | 4/2014 | Sridhar et al. | 370/392 |
| 2014/0208317 A1* | 7/2014 | Nakagawa | 718/1 |
| 2014/0325637 A1* | 10/2014 | Zhang | 726/15 |
| 2015/0016300 A1* | 1/2015 | Devireddy et al. | 370/254 |

OTHER PUBLICATIONS

Sajassi et al., "A Network Virtualization Overlay Solution using EVPN," https://tools.ietf.org/html/draft-sd-l2vpn-evpn-overlay-02, Jun. 18, 2014, 24 pages.

\* cited by examiner

*Primary Examiner* — Kevin M Cunningham
(74) *Attorney, Agent, or Firm* — Harrity & Harrity, LLP

(57) ABSTRACT

A network device receives, from another network device associated with a first data center, a route update that includes a common virtual network identifier or a first virtual network identifier associated with the first data center. The network device translates the common virtual network identifier or the first virtual network identifier to a second virtual network identifier associated with a second data center, where the second data center is different than the first data center. The network device provides the route update, with the second virtual network identifier, to the second data center.

20 Claims, 24 Drawing Sheets

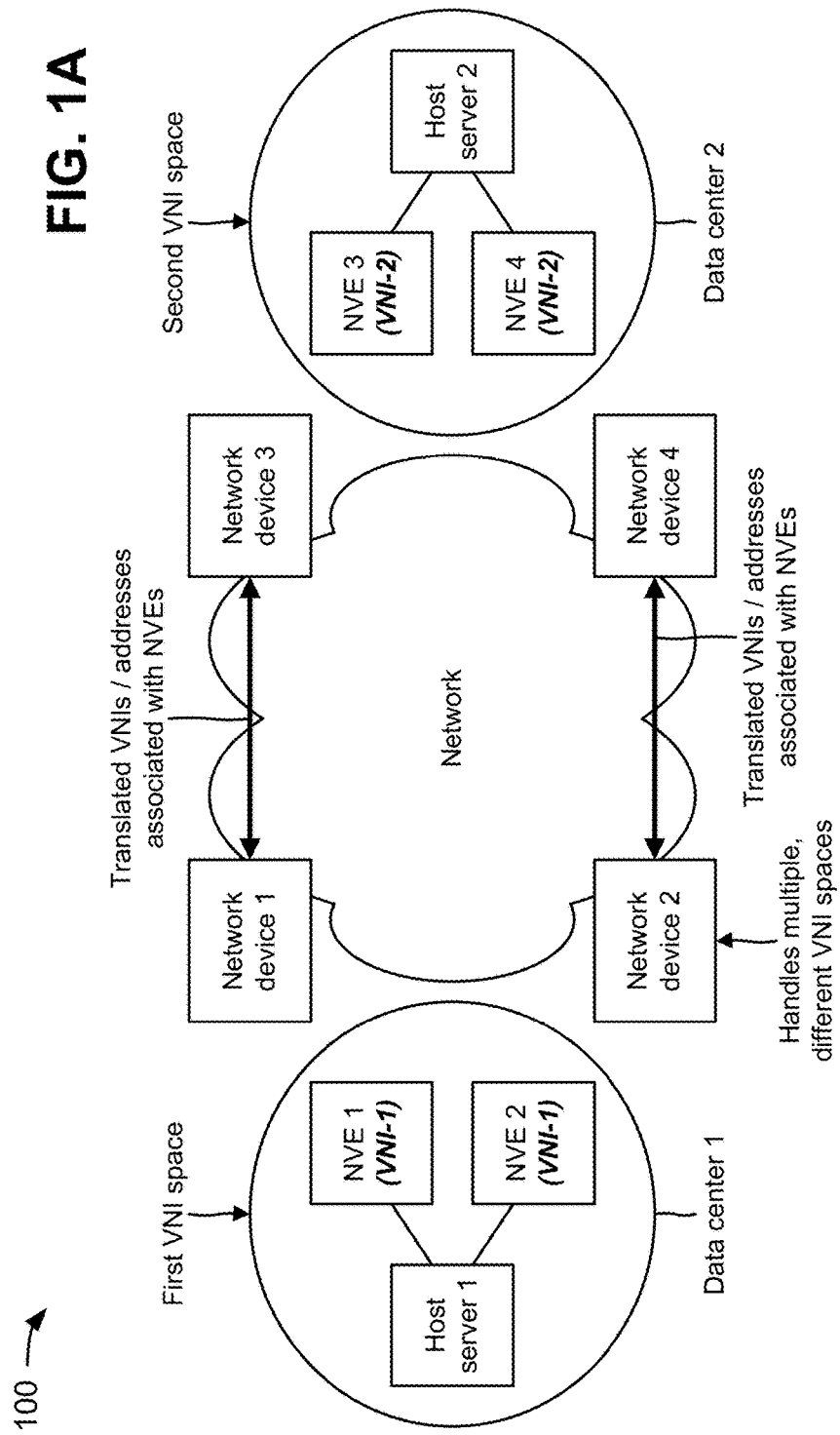

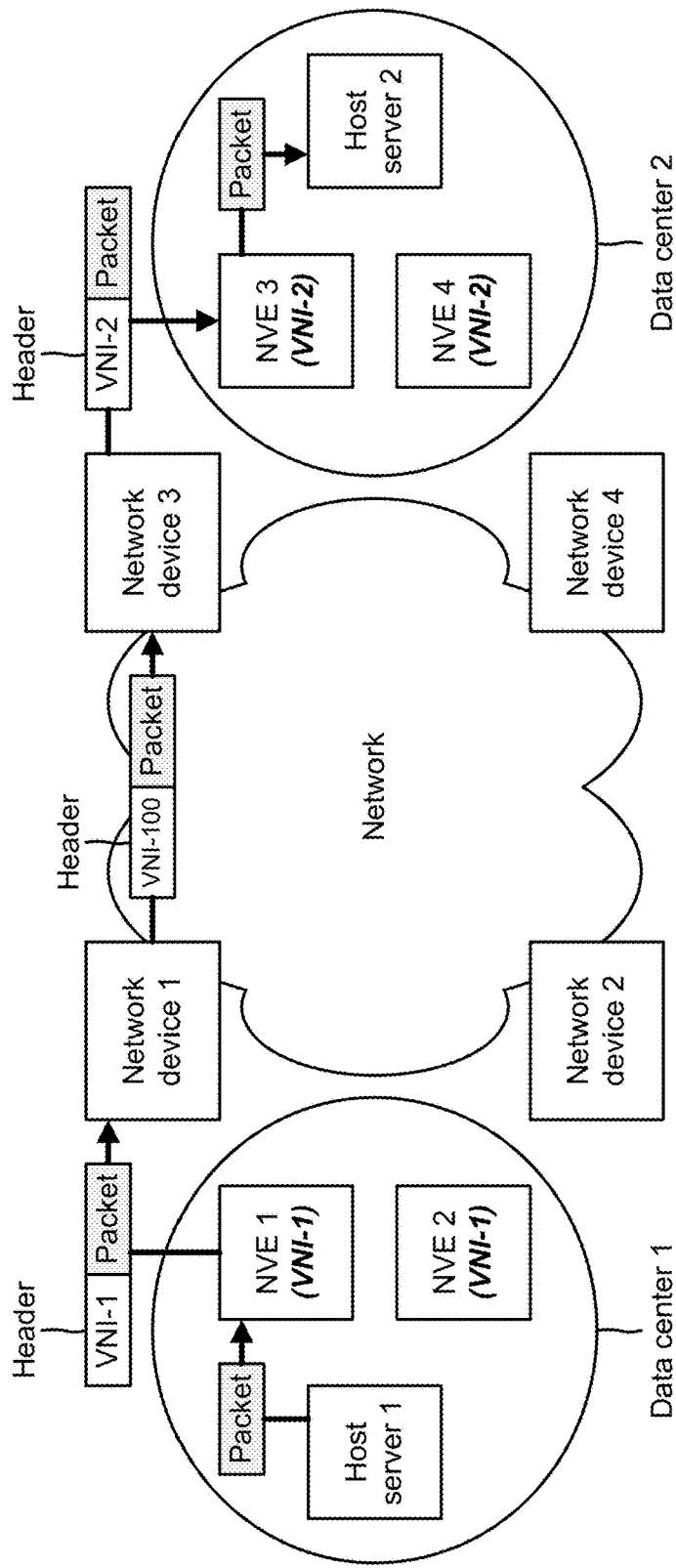

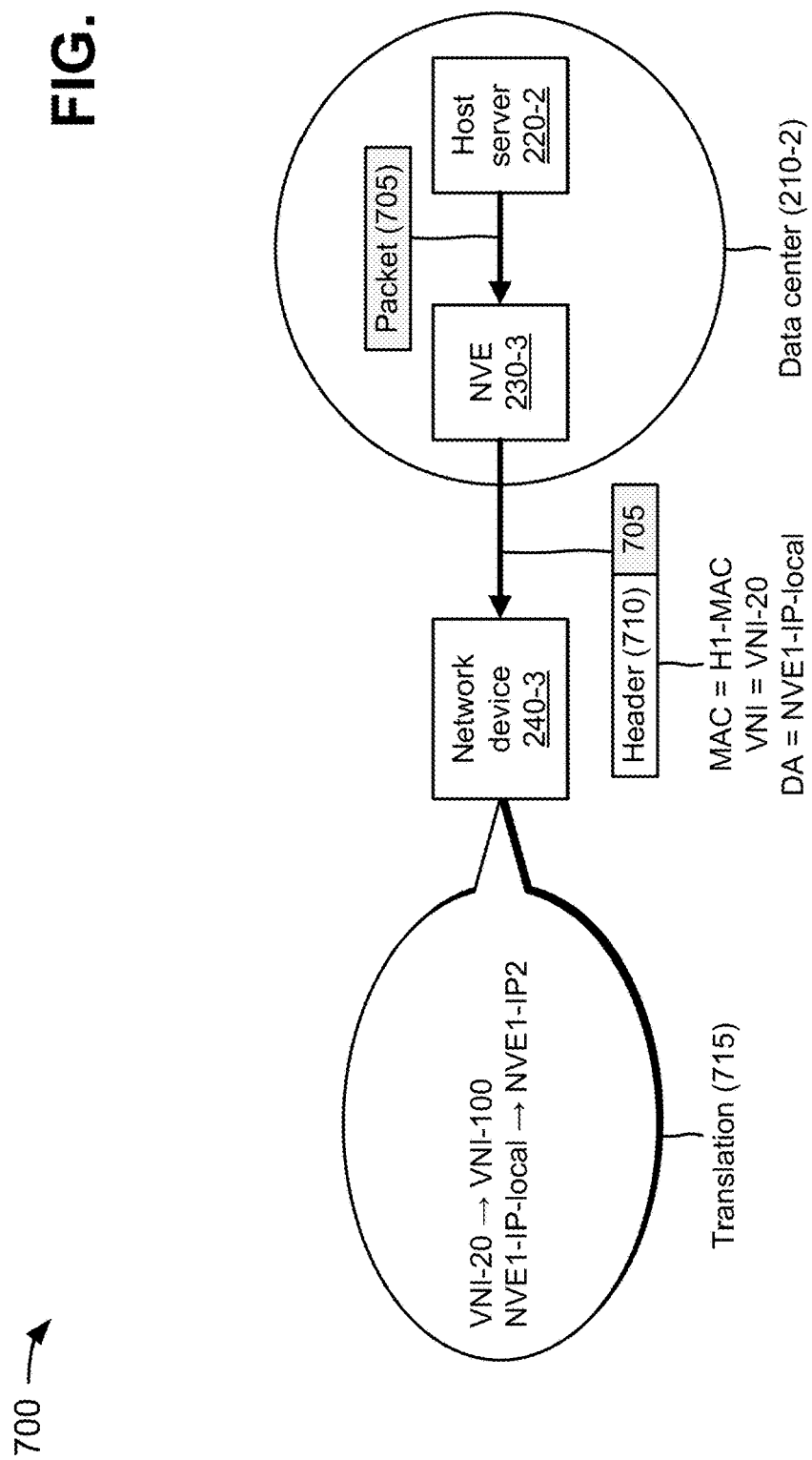

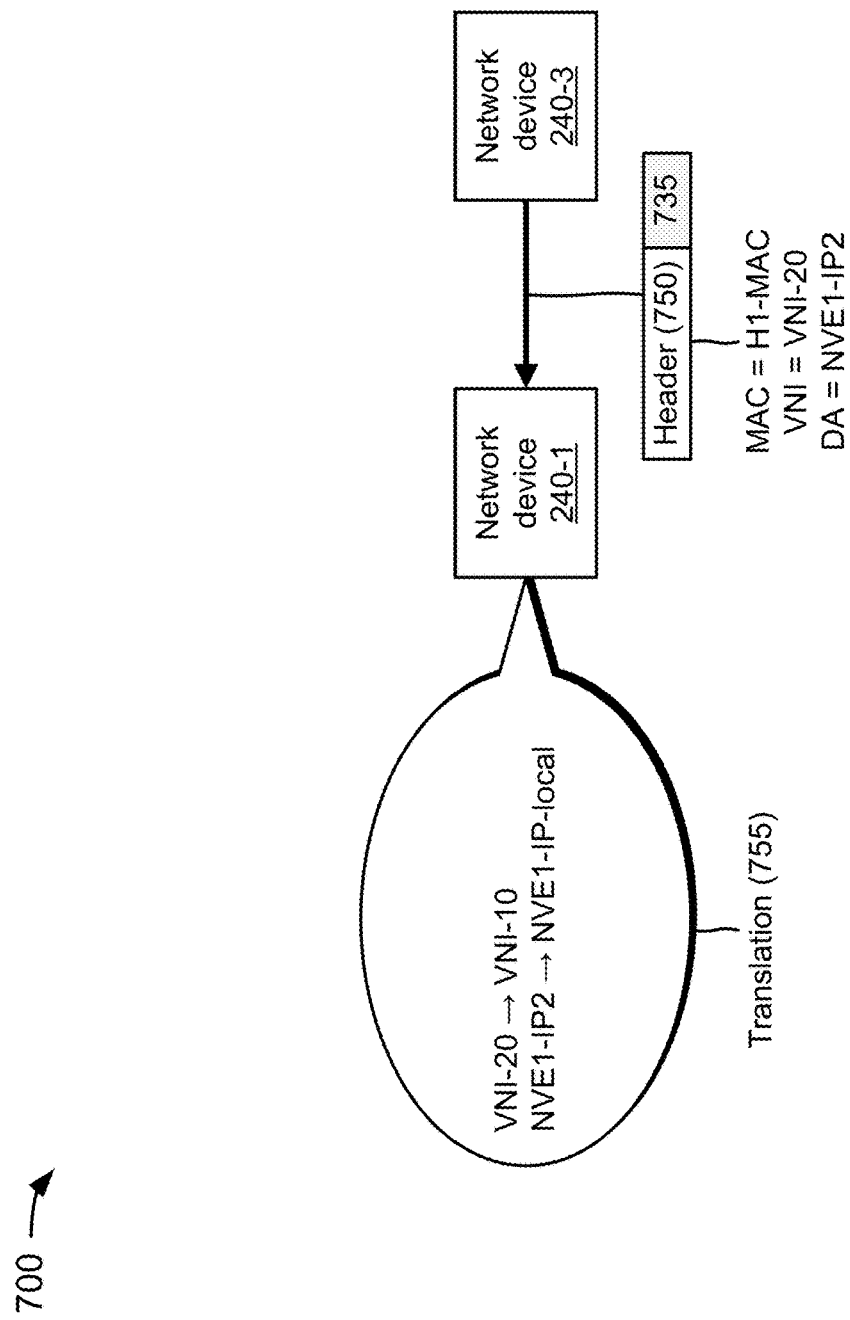

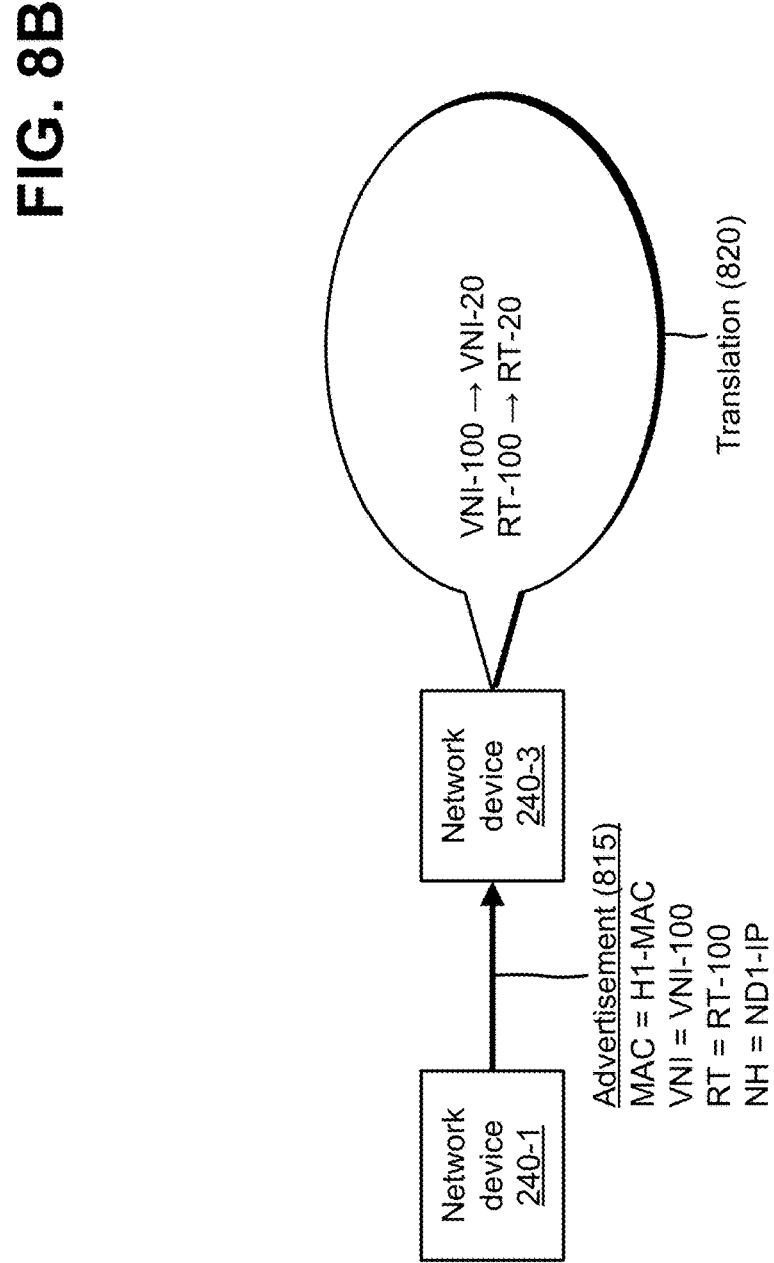

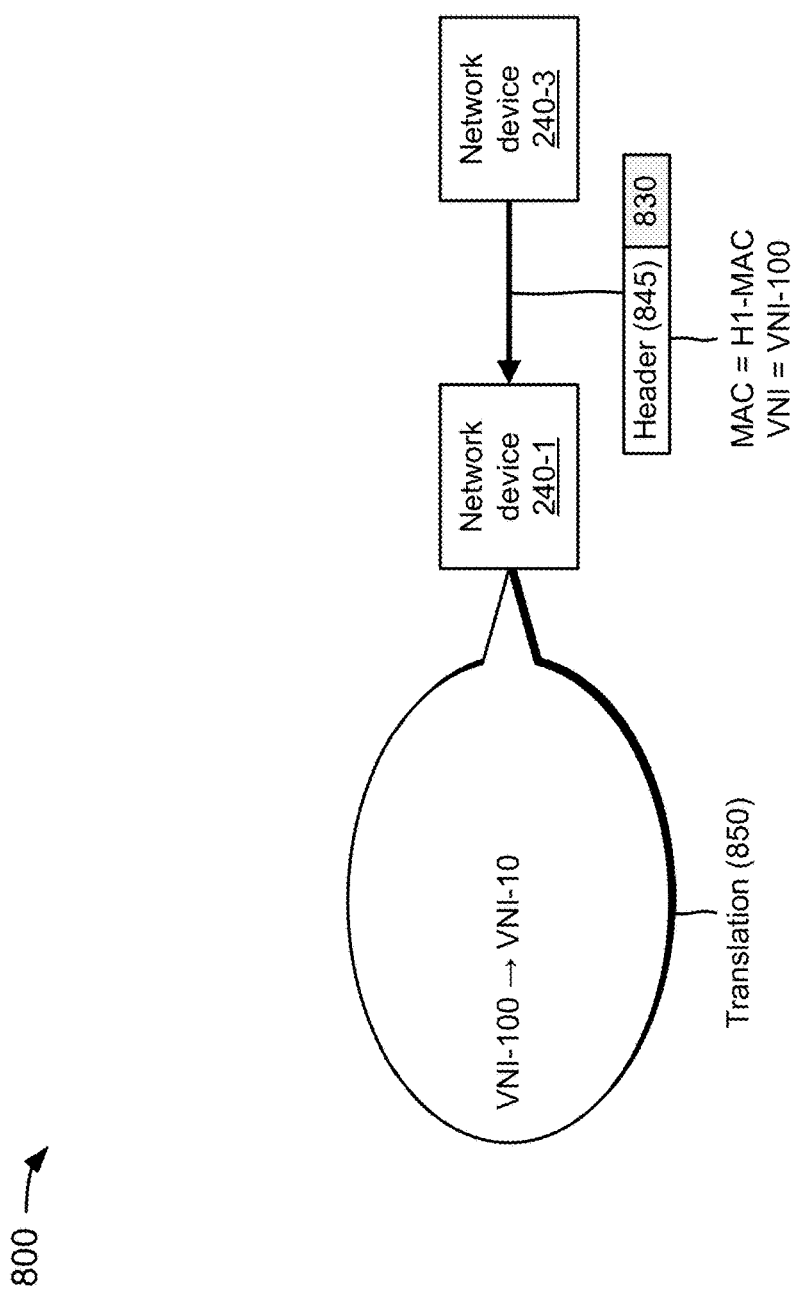

US 10,243,834 B1

INTERCONNECTING VIRTUAL NETWORKS USING AN ETHERNET VIRTUAL PRIVATE NETWORK (EVPN) AND VIRTUAL EXTENSIBLE LOCAL AREA NETWORK (VXLAN) BASED OVERLAY NETWORK

BACKGROUND

Data centers may include host server devices and network virtualization edge (NVE) devices. A NVE may include a network device that sits at the edge of an underlay network (e.g., a data center network) and implements layer 2 (L2) and/or layer 3 (L3) network virtualization functions. In one example, assume that NVEs in different data centers need to be interconnected, and that the NVEs use virtual network identifiers (VNIs) as unique identifiers within each data center. The VNIs may be unique within each data center but not across the data centers due to separate data center network management or a controller not spanning the data centers.

SUMMARY

In some implementations, a network device may include one or more processors to receive, from a first data center, a route update that includes a first virtual network identifier associated with the first data center, and translate the first virtual network identifier to one of a common virtual network identifier, or a second virtual network identifier associated with a second data center, the second data center being different than the first data center. The one or more processors may further provide the route update, with the common virtual network identifier or the second virtual network identifier, to another network device associated with the second data center to permit the other network device to translate the common virtual network identifier to the second virtual network identifier, when the route update includes the common virtual network identifier, and provide the route update to the second data center.

In some implementations, a method may include receiving, by a network device and from a first data center, a route update that includes a first virtual network identifier associated with the first data center, and translating, by the network device, the first virtual network identifier to one of a common virtual network identifier, or a second virtual network identifier associated with a second data center, the second data center being different than the first data center. The method may further include providing, by the network device, the route update, with the common virtual network identifier or the second virtual network identifier, to another network device associated with the second data center to permit the other network device to translate the common virtual network identifier to the second virtual network identifier, when the route update includes the common virtual network identifier, and provide the route update to the second data center.

In some implementations, a network device may include one or more processors to receive, from another network device associated with a first data center, a route update that includes a common virtual network identifier or a first virtual network identifier associated with the first data center. The one or more processors may translate the common virtual network identifier or the first virtual network identifier to a second virtual network identifier associated with a second data center, the second data center being different than the first data center. The one or more processors may further provide the route update, with the second virtual network identifier, to the second data center.

In some implementations, a method may include receiving, by a network device and from another network device associated with a first data center, a route update that includes a common virtual network identifier or a first virtual network identifier associated with the first data center. The method may include translating, by the network device, the common virtual network identifier or the first virtual network identifier to a second virtual network identifier associated with a second data center, the second data center being different than the first data center. The method may further include providing, by the network device, the route update, with the second virtual network identifier, to the second data center.

BRIEF DESCRIPTION OF THE DRAWINGS

FIGS. 1A and 1B are diagrams of an overview of an example implementation described herein;

FIGS. 7A-7F are diagrams of an example implementation relating to the example process shown in FIG. 6; and FIGS. 8A-8F are diagrams of alternative example implementations relating to the example processes shown in FIGS. 4 and 6.

DETAILED DESCRIPTION

Figure 2:
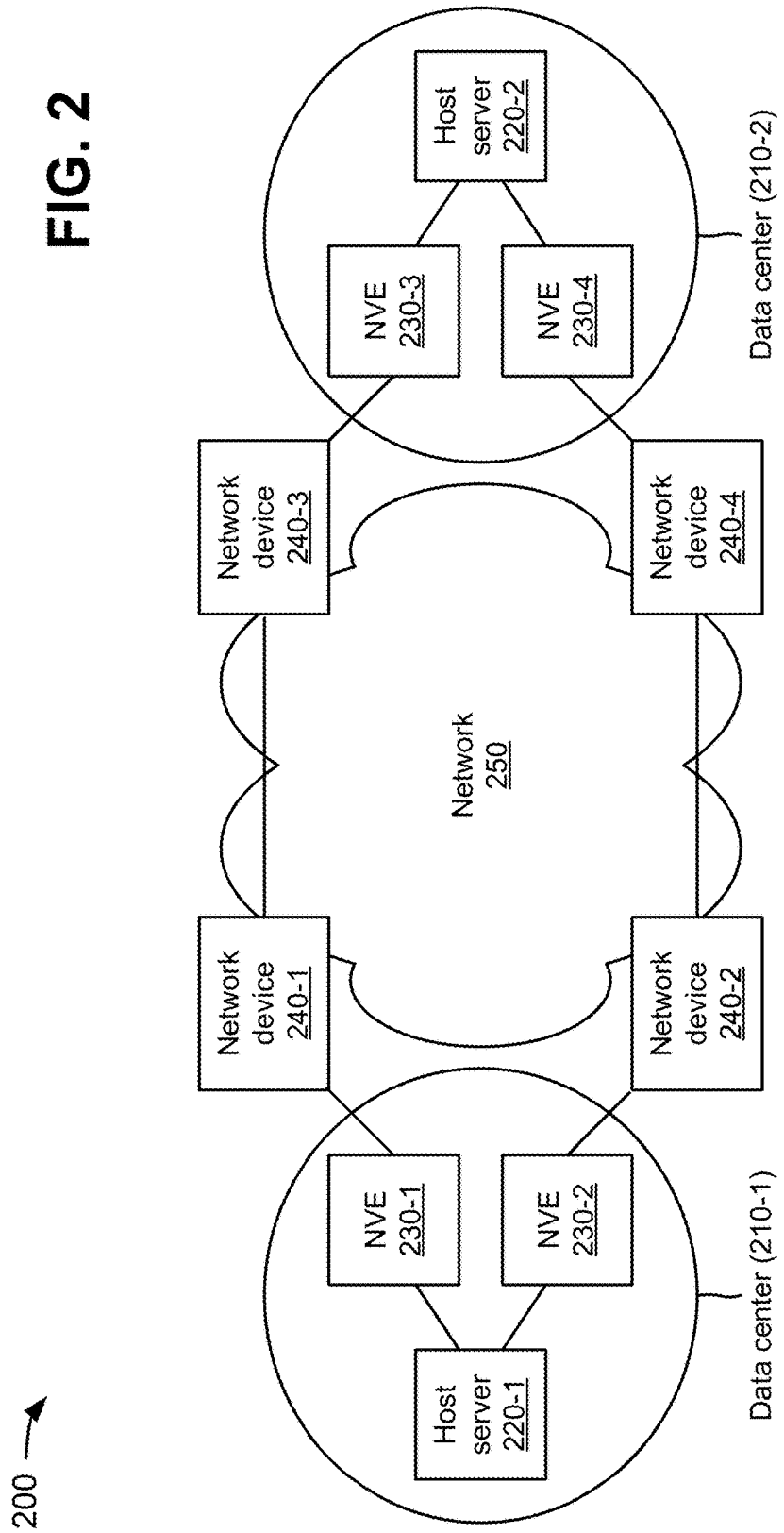
FIG. 2 is a diagram of an example environment in which systems and/or methods, described herein, may be implemented.

The following detailed description of example implementations refers to the accompanying drawings. The same reference numbers in different drawings may identify the same or similar elements.

NVEs in different data centers may be interconnected over a data center interconnection (DCI) by using downstream assigned VNIs that do not require any VNI translation by network devices (e.g., gateways) at the edges of the data center network. However, such downstream assigned VNIs are not possible for data centers that require unique VNIs, such as data centers that are managed independently by different entities (e.g., administrators). Moreover, downstream assigned VNIs are not supported on many platforms and require NVEs (e.g., with limited resources) to manage complex information associated with multiple VNI spaces.

Systems and/or methods, described herein, may enable different data centers to interconnect when identifiers (e.g., VNIs) are unique within the data centers. The systems and/or methods may enable devices with limited resources (e.g., NVEs), within a data center, to manage a single VNI space of the data center, and may enable devices with more resources (e.g., network devices at the edge of the data center network) to manage complex information associated with multiple VNI spaces. The systems and/or methods may provide a scalable solution since the network devices at the edges of the data center networks may not perform route lookup for traffic provided between data centers and may not maintain such routes in memory (e.g., a forwarding information base (FIB)).

FIGS. 1A and 1B are diagrams of an overview of an example implementation 100 described herein. As shown in FIG. 1A, assume that a first data center (Data center 1) and a second data center (Data center 2) are separately managed. The first data center may include a host server (Host server 1) and two NVEs (NVE 1 and NVE 2). The first data center may be associated with a unique first VNI space that includes a first VNI (VNI-1) assigned to NVE 1 and NVE 2. As further shown in FIG. 1A, the second data center may include a host server (Host server 2) and two NVEs (NVE 3 and NVE 4). The second data center may be associated with a unique second VNI space (e.g., different than the first VNI space) that includes a second VNI (VNI-2) assigned to NVE 3 and NVE 4. As further shown in FIG. 1A, network devices (Network device 1 and Network device 2) may be provided at the edge of the first data center and within a network (e.g., a wide area network (WAN), a local area network (LAN), a private network, or the like); and network devices (Network device 3 and Network device 4) may be provided at the edge of the second data center and within the network.

In some implementations, an Ethernet virtual private network (EVPN) and a virtual extensible local area network (VXLAN) may be used as a data center interconnection (DCI) between the data centers. The EVPN may provide Ethernet connectivity between data centers spanning the network. The VXLAN may include an encapsulation protocol for executing an overlay network on an existing Layer 3 infrastructure, such as the network in FIG. 1A. As further shown in FIG. 1A, since the data centers include different VNI spaces, the network devices may translate VNIs and addresses (e.g., Internet protocol (IP) addresses) associated with traffic (e.g., one or more packets) provided between NVEs of different data centers. In some implementations, the network devices may utilize a global or common VNI for the data center interconnection. Alternatively, the network devices may utilize a downstream assigned VNI for the data center interconnection. In both implementations, the network devices may manage multiple, different VNI spaces (e.g., the first VNI space and the second VNI space), while NVE 1 and NVE 2 may manage the first VNI space and NVE 3 and NVE 4 may manage the second VNI space.

As shown in FIG. 1B, assume that host server 1 in data center 1 needs to provide a packet to host server 2 in data center 1, and that host server 1 provides the packet to NVE 1. NVE 1 may perform a lookup for an address (e.g., a media access control (MAC) address) associated with host server 2, and may determine a VNI (e.g., VNI-1) and an endpoint address (e.g., an address associated with NVE 3) for a packet header based on the lookup. NVE 1 may provide the packet encapsulated with the header to network device 1, as further shown in FIG. 1B. Network device 1 may translate the VNI of the packet header from VNI-1 to a global or common VNI (e.g., VNI-100), and may forward the packet to network device 3. Network device 3 may translate the VNI of the packet header from VNI-100 to VNI-2 so that the packet may be forwarded in the second data center. As further shown in FIG. 1B, network device 3 may forward the packet to NVE 3, and NVE 3 may forward the packet to host server 2.

Systems and/or methods, described herein, may provide a scalable scheme that performs VNI translation without maintaining a forwarding information base, and performs address translation associated with NVEs of different data centers. The systems and/or methods may utilize the scalable scheme to interconnect portions or modules of data centers, such as performance optimized data centers (PODs). The systems and/or methods may extend layer 2 and layer 3 domains across multiple data centers and/or PODs, using VXLAN encapsulation and without adding the complexity of managing different VNI spaces to low-end, cost-sensitive edge devices (e.g., NVEs). The systems and/or methods may enable high-end devices (e.g., network devices) to manage the VNI translation associated with different VNI spaces, while not requiring such devices to maintain a forwarding information base for interconnecting data centers.

Although the systems and/or methods are described in connection with data centers, the systems and/or methods may also be utilized with inter-POD network architectures and/or non-data center network architectures. Furthermore, the systems and/or methods are described in connection with data centers since the systems and/or methods may be more commonly utilized with data centers.

FIG. 2 is a diagram of an example environment 200 in which systems and/or methods, described herein, may be implemented. As shown in FIG. 2, environment 200 may include two data centers 210-1 and 210-2 (hereinafter referred to collectively as data centers 210, and individually as data center 210) interconnected by a network 250. Data center 210-1 may include a host server 220-1 and two NVEs 230-1 and 230-2 (hereinafter referred to collectively as NVEs 230, and individually as NVE 230), and data center 210-2 may include a host server 220-2 and two NVEs 230-3 and 230-4. Network 250 may include four network devices 240-1 through 240-4 (hereinafter referred to collectively as network devices 240, and individually as network device 240). The number and arrangement of data centers 210, host servers 220, NVEs 230, and network devices 240 shown in FIG. 2 are provided as an example. Devices and/or networks of environment 200 may interconnect via wired connections, wireless connections, or a combination of wired and wireless connections.

Data center 210 may include one or more facilities and/or one or more networks with computer systems, server devices, and associated components, such as telecommunications and storage systems. Data center 210 may include redundant or backup power supplies, redundant data communications connections, environmental controls, security devices, or the like. In some implementations, data center 210-1 and data center 210-2 may share information, via network 250. In some implementations, data center 210 may include resources, such as a device (e.g., a network device, a server, a computer system, or the like), data (e.g., availability information, license information, or the like), a service (e.g., a load balancing service, network information collection, or the like), or the like.

Host server 220 may include one or more personal computers, workstation computers, server devices, or other types of computation and communication devices. In some implementations, host server 220-1 and host server 220-2 may share information, via network 250.

NVE 230 may include a network device provided at an edge of an underlay network (e.g., a network associated with data center 210) and that implements layer 2 and/or layer 3 network virtualization functions. In some implementations, NVE 230 may utilize the underlay layer 3 network to tunnel traffic to and from other NVEs 230. In some implementations, NVE 230 may send and receive traffic to and from other data centers 210 via network 250. In some implementations, NVE 230 may be implemented as part of a virtual switch within a hypervisor, a physical switch, a physical router, or a network service appliance, or may be split across multiple devices.

Network device 240 may include a device capable of receiving, transmitting, processing, routing, or the like, packets travelling between data centers 210-1 and 210-2, via network 250. For example, network device 240 may include a router, a switch, a gateway, a modem, a firewall, a network interface controller (NIC), a hub, a bridge, a proxy server, an optical add-drop multiplexer (OADM), or another type of network device. In some implementations, network device 240 may include one or more input ports associated with receiving packets and one or more output ports associated with transmitting packets. In some implementations, network device 240 may be connected to one or more other network devices 240. In some implementations, network device 240 may communicate with other devices (not shown) in order to process and/or route packets received by network device 240.

Network 250 may include one or more wired and/or wireless networks that include network devices 240 and/or allow network devices 240 to communicate. For example, network 250 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
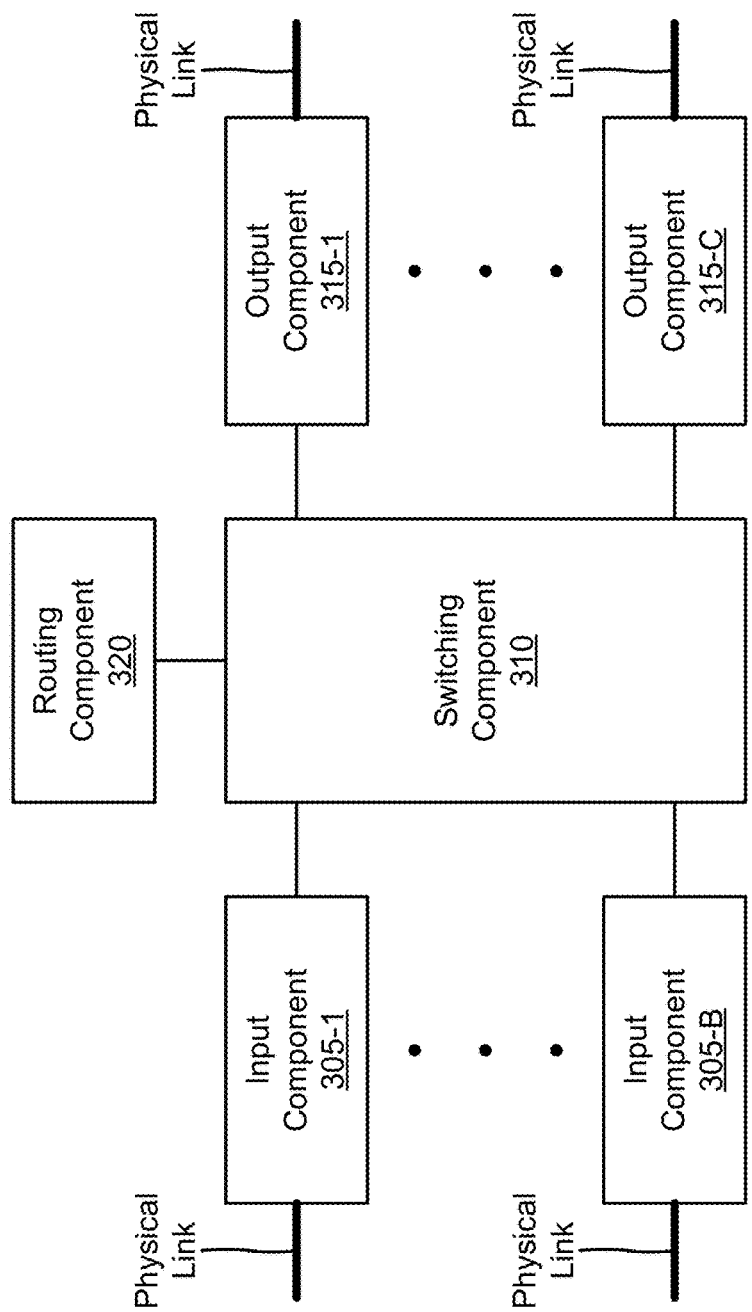
FIG. 3 is a diagram of example components of a network device of FIG. 2.

FIG. 3 is a diagram of example components of a network device 240. As shown in FIG. 3, network device 240 may include one or more input components 305-1 through 305-B (B≥1) (hereinafter referred to collectively as input components 305, and individually as input component 305), a switching component 310, one or more output components 315-1 through 315-C(C≥1) (hereinafter referred to collectively as output components 315, and individually as output component 315), and a routing component 320.

Input component 305 may be a point of attachment for a physical link and may be a point of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 with output components 315. In some implementations, switching component 310 may be implemented via one or more crossbars, via one or more busses, and/or with one or more shared memories. The shared memories may act as temporary buffers to store packets from input components 305 before the packets are eventually scheduled for delivery to output components 315. In some implementations, switching component 310 may enable input components 305, output components 315, and/or routing component 320 to communicate.

Output component 315 may be a point of attachment for a physical link and may be a point of exit for outgoing traffic, such as packets. Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Routing component 320 may include one or more processors, microprocessors, application-specific integrated circuits (ASICs), field programmable gate arrays (FPGAs), or similar types of processing components. A processor is implemented in hardware, firmware, or a combination of hardware and software. In some implementations, routing component 320 may include a random access memory (RAM), a read only memory (ROM), and/or another type of dynamic or static storage device (e.g., a flash memory, a magnetic memory, an optical memory, etc.) that stores information and/or instructions. In some implementations, input component 305, switching component 310, and/or output component 315 may include one or more processors, microprocessors, ASICs, FPGAs, or similar types of processing components; and RAM, ROM, and/or another type of dynamic or static storage device that stores information and/or instructions.

In some implementations, routing component 320 may communicate with other devices, networks, and/or systems connected to network device 240 to exchange information regarding network topology. Routing component 320 may create routing tables based on the network topology information, create forwarding tables based on the routing tables, and provide the forwarding tables to input components 305 and/or output components 315. Input components 305 and/or output components 315 may use the forwarding tables to perform route lookups for incoming and/or outgoing packets.

The number and arrangement of components shown in FIG. 3 are provided as an example. In practice, network device 240 may include additional components, fewer components, different components, or differently arranged components than those shown in FIG. 3. Additionally, or alternatively, a set of components (e.g., one or more components) of network device 240 may perform one or more functions described as being performed by another set of components of network device 240.

Figure 4:
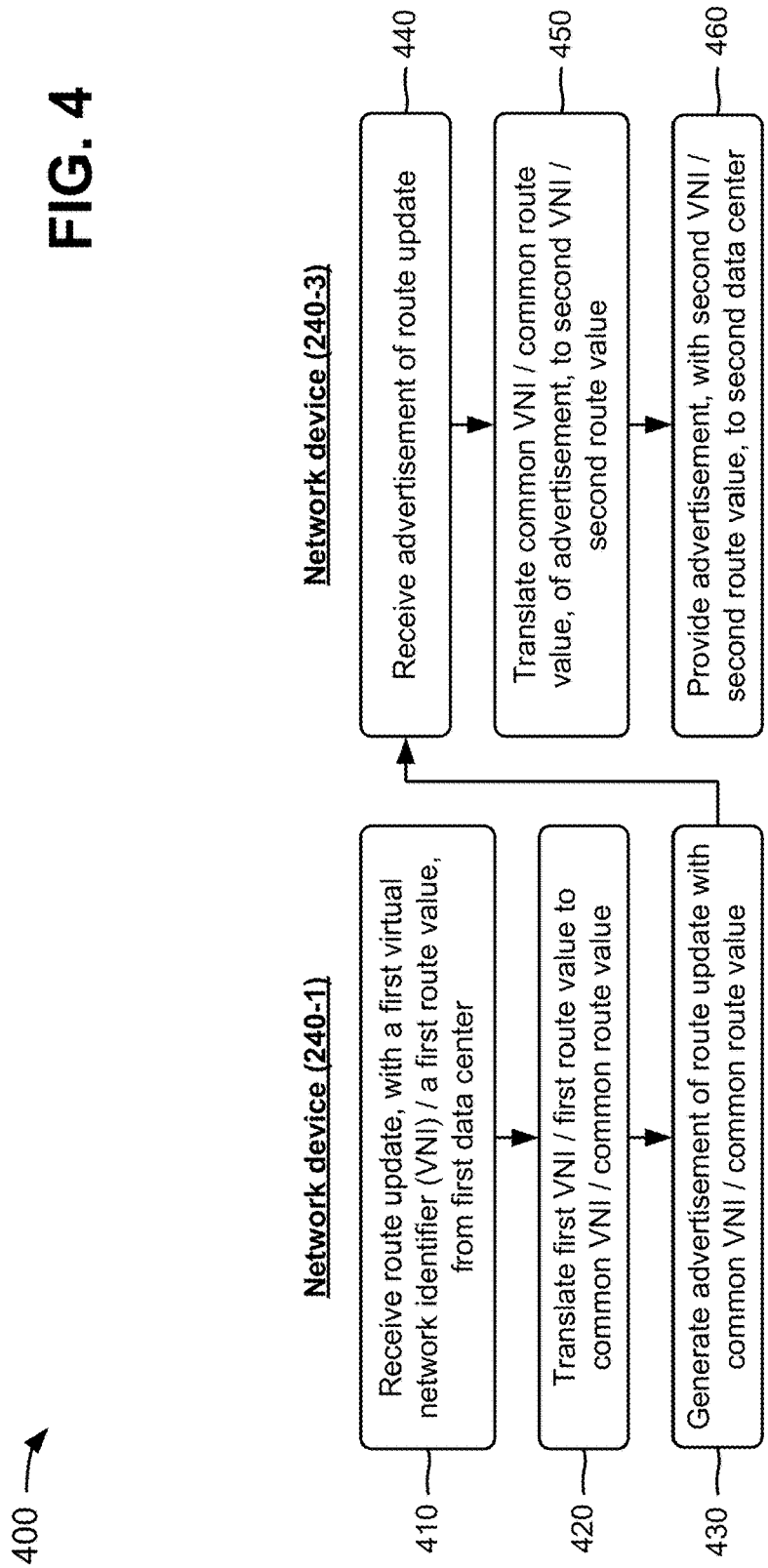
FIG. 4 is a flow chart of an example process for setting up a control plane associated with network devices and data centers.

FIG. 4 is a flow chart of an example process 400 for setting up a control plane associated with network devices and data centers. In some implementations, one or more process blocks of FIG. 4 may be performed by network device 240. In some implementations, one or more process blocks of FIG. 4 may be performed by another device or a group of devices separate from or including network device 240, such as NVE 230. In some implementations, process 400 may include control plane setup procedures associated with environment 200. Although FIG. 4 is described in connection with network device 240-1 and network device 240-3, process 400 may be performed by any combination of network devices 240-1 through 240-4.

As shown in FIG. 4, process 400 may include receiving a route update, with a first virtual network identifier (VNI) and a first route value, from a first data center (block 410). For example, network device 240-1 may receive a route update from NVE 230-1. In some implementations, the route update may be for an address (e.g., a MAC address) associated host server 220-1. In some implementations, the route update may include a border gateway protocol (BGP) MAC route update for the MAC address associated with host server 220-1 (e.g., H1-MAC). In some implementations, the route update may include a particular VNI associated with a bridge domain (e.g., NVE 230-1) of data center 210-1, a route target value, and a next hop address (e.g., an IP address of NVE 230-1). A route target value may include a sixty-four (64) bit BGP community used to tag prefixes and to inform provider edge routers which prefixes can be imported. In one example, assume that the particular VNI is VNI-10, the route target value is RT-10, and the next hop address is NVE1-IP-local (if NVE 230-1 includes a private address) or NVE1-IP-public (if NVE 230-1 includes a public address).

As further shown in FIG. 4, process 400 may include translating the first VNI and the first route value to a common VNI and a common route value (block 420). For example, network device 240-1 may translate the first VNI to a common or global VNI, and may translate the first route value to a common route value. In some implementations, the common VNI may include a single global VNI that is agreed upon by operators of data center 210-1 and data center 210-2. In such implementations, the common route target value may be automatically derived from the agreed upon VNI. For example, assume that the common VNI is set to VNI-100 and that the common route target value is automatically derived to be RT-100. In such an example, network device 240-1 may translate the particular VNI (e.g., VNI-10) to the common VNI (e.g., VNI-100), and may translate the route target value (e.g., RT-10) to the common route target value (e.g., RT-100). In some implementations, if network device 240-1 cannot support multiple VNI spaces or cannot forward based on downstream assigned VNIs, the operator of data center 210-1 may utilize a non-overlapping set of VNIs in data center 210-1 and for the common VNI.

In some implementations, a downstream assigned VNI may be utilized between network devices 240 (e.g., between network device 240-1 and network device 240-3). In such implementations, operators of data center 210-1 and data center 210-2 may agree on a route target value used to import and/or export traffic at network devices 240. For example, the downstream assigned VNI associated with network device 240-3 may include a VNI associated with data center 210-2 (e.g., VNI-20), and a derived route target value associated with network device 240-3 may be RT-20. In such an example, network device 240-1 may translate the particular VNI (e.g., VNI-10) to the downstream assigned VNI (e.g., VNI-20), and may translate the route target value (e.g., RT-10) to the derived route target value (e.g., RT-20).

In some implementations, if NVE 230-1 includes a private address, network device 240-1 may translate the private next hop address (e.g., NVE1-IP-local) to another address (e.g., NVE1-IP2) in order to protect the private next hop address. Alternatively, if NVE 230-1 includes a public next hop address (e.g., NVE1-IP-public), network device 240-1 may not translate the next hop address. In some implementations, the VNI translation and the translation of the next hop address may be independent of each other. For example, while the VNI translation may be required, the next hop address translation may be optional. The next hop address translation may be required when the next hop address is private (e.g., if NVE 230-1 includes a private address) and the private address of NVE 230-1 is to be hidden outside of data center 210-1. The next hop address translation may not be required when the next hop address is public (e.g., if NVE 230-1 includes a public address) or when the next hop address is private but need not be hidden outside of data center 210-1.

As further shown in FIG. 4, process 400 may include generating an advertisement of the route update with the common VNI and the common route value (block 430). For example, network device 240-1 may generate an advertisement of the route update, and the advertisement may include the address of host server 220-1 (e.g., H1-MAC), the common VNI (e.g., VNI-100), the common route target value (e.g., RT-100), and the next hop address (e.g., NVE1-IP2 if the address of NVE 230-1 is private and translated). In some implementations, if the address of NVE 230-1 is public, the next hop address may include the public address (e.g., NVE1-IP-public). In some implementations, network device 240-1 may provide the advertisement to network device 240-3. In some implementations, if the downstream assigned VNI is utilized between network devices 240, the advertisement may include the downstream assigned VNI (e.g., VNI-20) and the derived route target value (e.g., RT-20) instead of the common VNI (e.g., VNI-100) and the common route target value (e.g., RT-100).

As further shown in FIG. 4, process 400 may include receiving the advertisement of the route update (block 440). For example, network device 240-3 may receive the advertisement of the route update from network device 240-1. In some implementations, network device 240-3 may receive the advertisement from network device 240-1, via network 250. In some implementations, the advertisement may include the address of host server 220-1 (e.g., H1-MAC); the common VNI (e.g., VNI-100) or the downstream assigned VNI (e.g., VNI-20); the common route target value (e.g., RT-100) or the derived route target value (e.g., RT-20); and the next hop address (e.g., NVE1-IP2 if the address of NVE 230-1 is private and translated).

As further shown in FIG. 4, process 400 may include translating the common VNI and the common route value, of the advertisement, to a second VNI and a second route value (block 450). For example, network device 240-3 may translate the common VNI (e.g., VNI-100) of the advertisement to a second VNI (e.g., VNI-20) that is compatible with data center 210-2, and may translate the common route target value (e.g., RT-100) of the advertisement to a second route target value (e.g., RT-20) that is compatible with data center 210-2. In some implementations, if the advertisement includes the downstream assigned VNI (e.g., VNI-20) and the derived route target value (e.g., RT-20), network device 240-3 may not translate the downstream assigned VNI and the derived route target value since the downstream assigned VNI and the derived route target value are compatible with data center 210-2.

In some implementations, if NVE 230-1 includes a private address and the advertisement includes the next hop address (e.g., NVE1-IP2), network device 240-3 may translate the next hop address (e.g., NVE1-IP2) to the private next hop address (e.g., NVE1-IP-local). Alternatively, if NVE 230-1 includes a public next hop address (e.g., NVE1-IP-public), network device 240-3 may not translate and may utilize the public next hop address.

As further shown in FIG. 4, process 400 may include providing the advertisement, with the second VNI and the second route value, to a second data center (block 460). For example, network device 240-3 may provide the advertisement to data center 210-2, such as to NVE 230-3 and NVE 230-4 of data center 210-2. In some implementations, the advertisement may include the address of host server 220-1 (e.g., H1-MAC); the second VNI or the downstream assigned VNI (e.g., VNI-20); the second route target value or the derived route target value (e.g., RT-20); and the next hop address (e.g., NVE1-IP-local or NVE1-IP-public). In some implementations, NVE 230-3 and NVE 230-4 may receive the advertisement of the route update, and may store the route update in memory.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show examples of setting up a control plane associated with network devices 240.

Figure 5A:
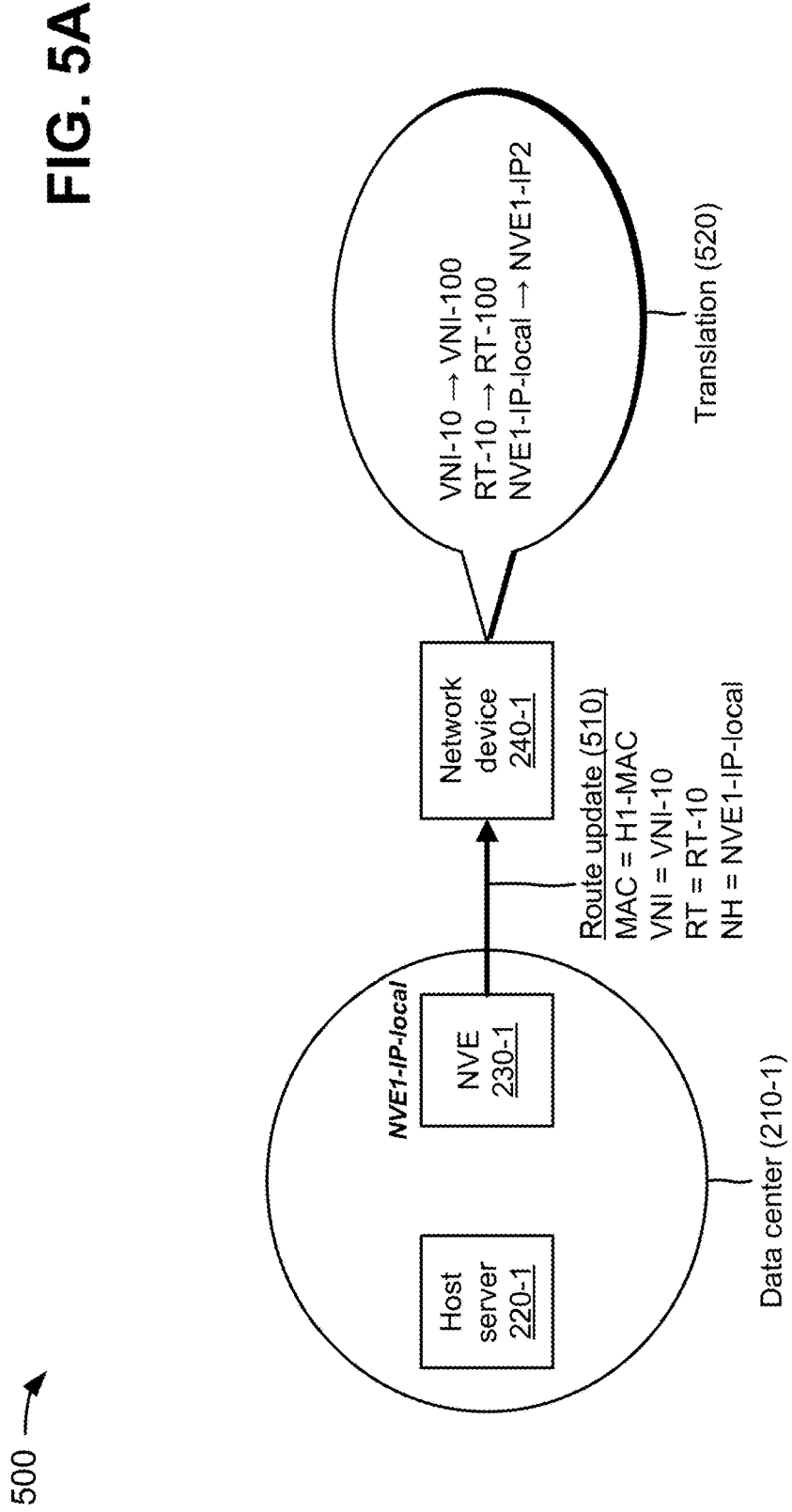
FIGS. 5A-5F are diagrams of an example implementation relating to the example process shown in FIG. 4.
Figure 5B:
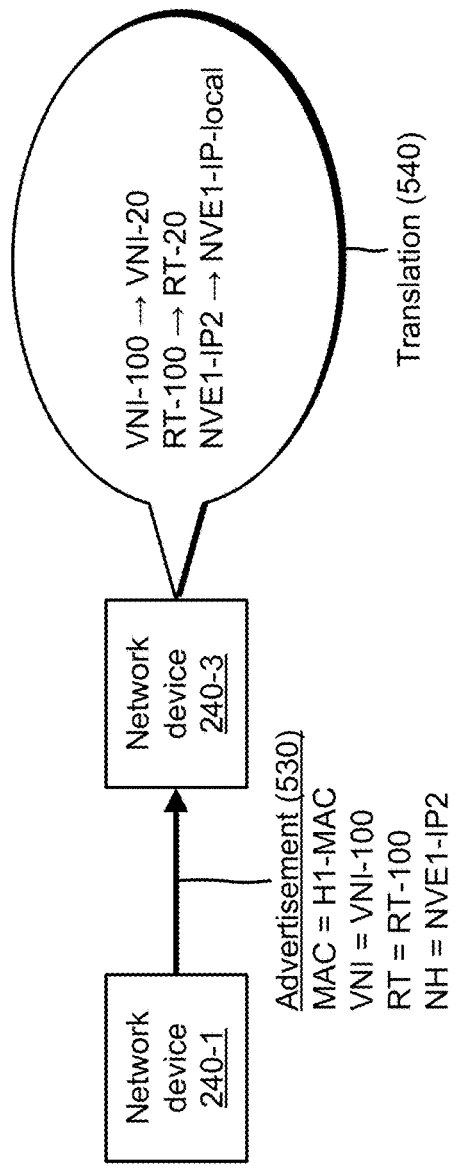
Figure 5C:
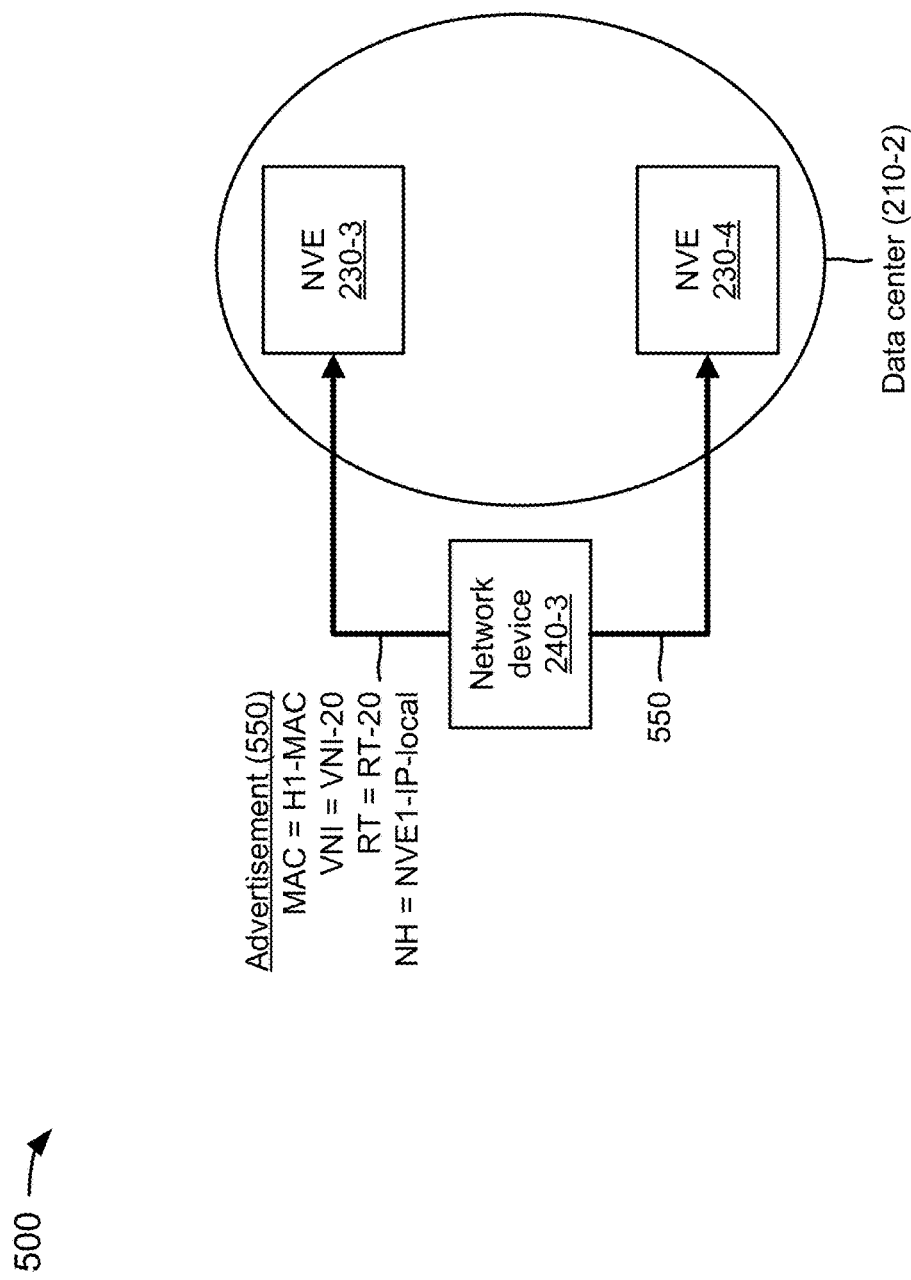

FIGS. 5A-5C show an example of setting up a control plane when a common VNI is used for the data center interconnection and network devices 240 do not perform route lookup. In the example of FIGS. 5A-5C, assume that bridge domains are represented with different VNIs in each data center 210 (e.g., VNI-10 in data center 210-1 and VNI-20 in data center 210-2), and that the VNIs may be translated to a common VNI (e.g., VNI-100) between network device 240-1 and network device 240-3. Further, assume that network device 240-1 and network device 240-3 are configured with a VNI mapping to enable translation of VNIs in the control plane when route updates are generated. For example, network device 240-1 may be configured with a VNI mapping to enable translation of VNI-10 to VNI-100 in a route update associated with host server 220-1. Network device 240-3 may be configured with a VNI mapping to enable translation of VNI-20 to VNI-100 in a route update associated with host server 220-2. The VNI mapping may also be used to translate VNIs in the data plane.

As shown in FIG. 5A, NVE 230-1 may generate a route update 510 for an address associated with host server 220-1 (e.g., H1-MAC) of data center 210-1. Route update 510 may include a VNI of VNI-10, a route target value of RT-10, and a next hop address (NH) of NVE1-IP-local (e.g., a private address of NVE 230-1). As further shown in FIG. 5A, NVE 230-1 may provide route update 510 to network device 240-1, provided at an edge of data center 210-1. Network device 240-1 may receive route update 510, and may perform a translation 520 of information provided in route update 510. For example, network device 240-1 may translate the VNI (e.g., VN-10) to the common VNI (e.g., VNI-100); may translate the route target value (e.g., RT-10) to a common route target value (e.g., RT-100) derived from the common VNI; and may translate the next hop address (e.g., NVE1-IP-local) to another IP address (e.g., NVE1-IP2).

As shown in FIG. 5B, after translation 520 of the information provided in route update 510, network device 240-1 may generate an advertisement 530 based on the translated route update 510. Advertisement 530 may include the address associated with host server 220-1 (e.g., H1-MAC), the common VNI (e.g., VNI-100), the common route target value (e.g., RT-100), and the translated next hop address (e.g., NVE1-IP2). As further shown in FIG. 5B, network device 240-1 may provide advertisement 530 (e.g., may advertise the translated route update) to network device 240-3. Network device 240-3 may receive advertisement 530, and may perform a translation 540 of information provided in advertisement 530. For example, network device 240-3 may translate the common VNI (e.g., VN-100) to a VNI (e.g., VNI-20) associated with data center 210-2; may translate the common route target value (e.g., RT-100) to a route target value (e.g., RT-20) associated with data center 210-2 and derived from VNI-20; and may translate the translated next hop address (e.g., NVE1-IP2) to the next hop address (e.g., NVE1-IP-local) associated with NVE 230-1.

As shown in FIG. 5C, after translation 540 of the information provided in advertisement 530, network device 240-3 may generate an advertisement 550 based on the translated advertisement 530, and may store advertisement 550. Advertisement 550 may include the address associated with host server 220-1 (e.g., H1-MAC), the VNI (e.g., VNI-20) associated with data center 210-2, the route target value (e.g., RT-20) associated with data center 210-2, and the next hop address (e.g., NVE1-IP-local) associated with NVE 230-1. As further shown in FIG. 5C, network device 240-3 may provide advertisement 550 (e.g., may advertise the translated route update) to NVE 230-3 and/or NVE 230-4 of data center 210-2, and NVE 230-3 and/or NVE 230-4 may store advertisement 550.

Figure 5D:
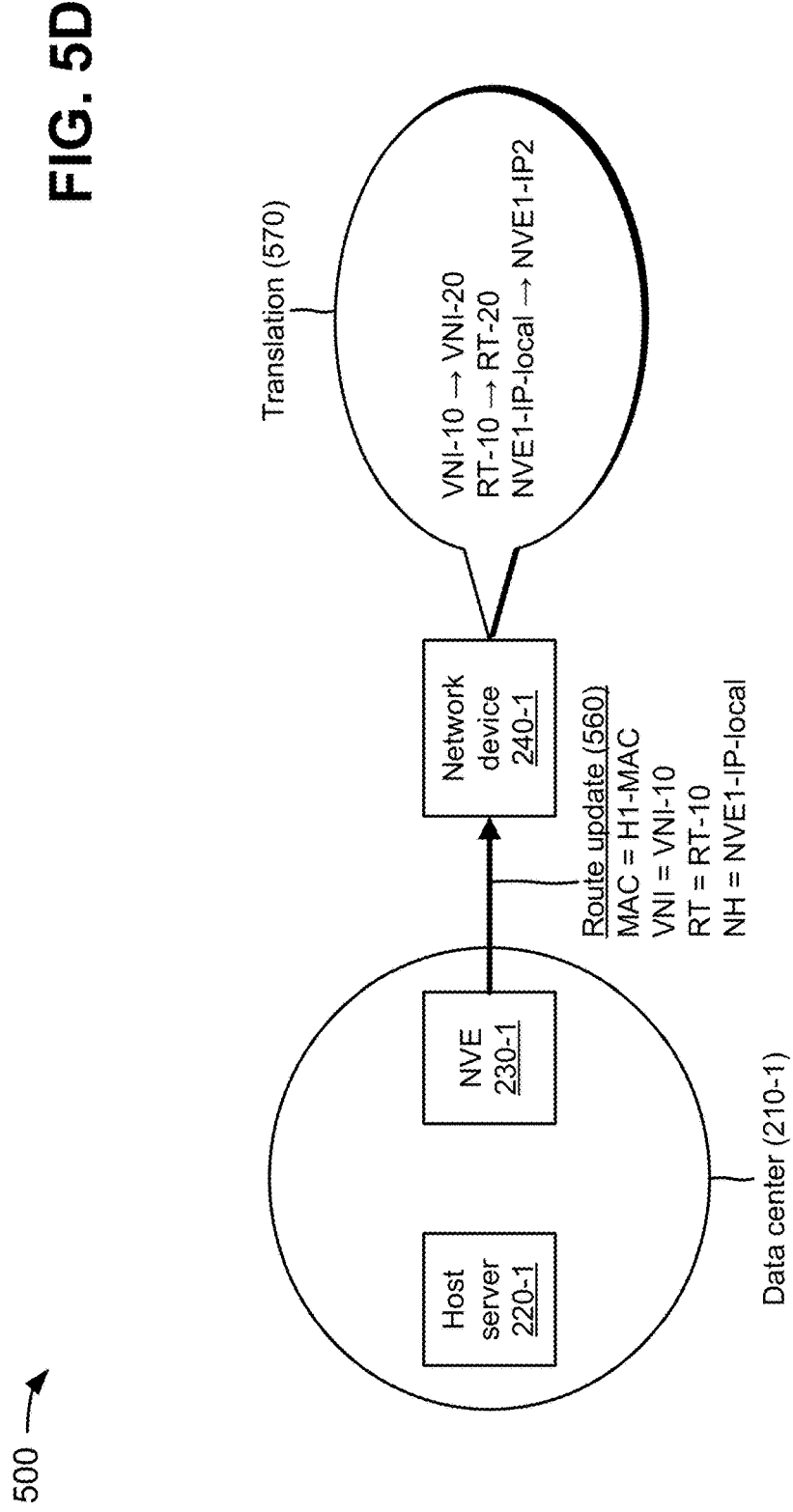
Figure 5E:
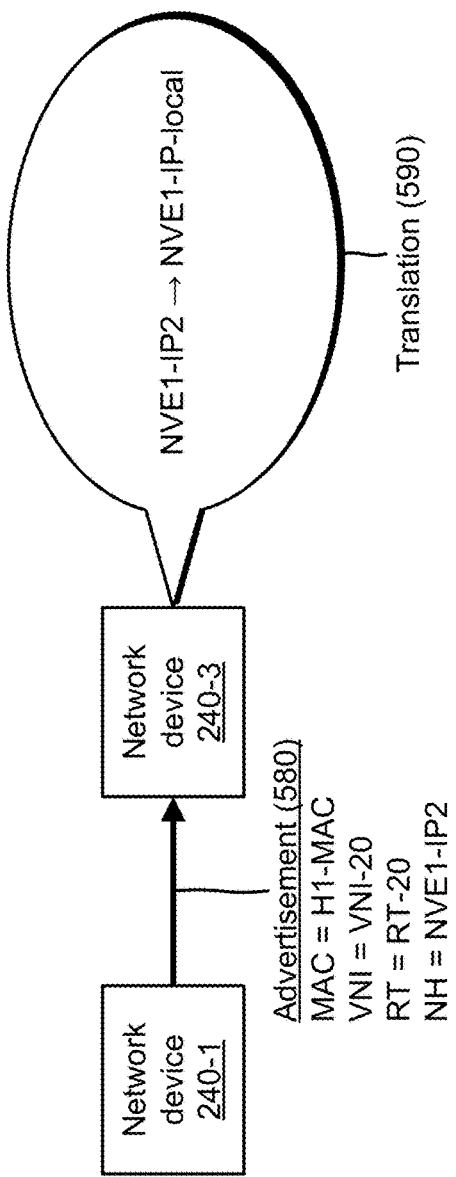
Figure 5F:
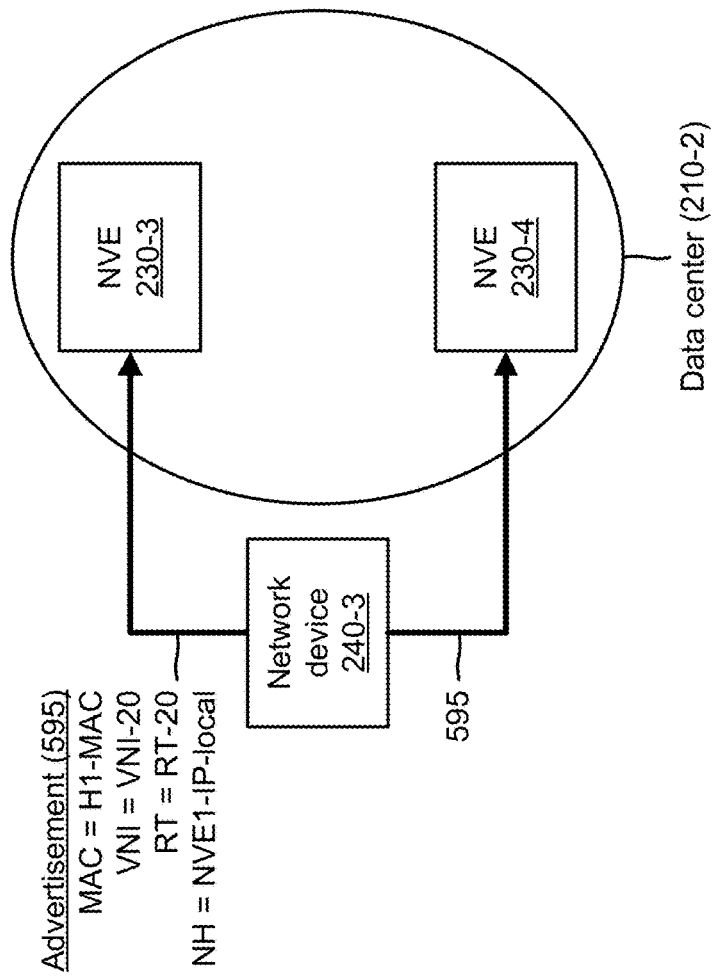

FIGS. 5D-5F show an example of setting up a control plane when a downstream assigned VNI is used for the data center interconnection and network devices 240 do not perform route lookup. In the example of FIGS. 5D-5F, assume that bridge domains are represented with different VNIs in each data center 210 (e.g., VNI-10 in data center 210-1 and VNI-20 in data center 210-2), and that the VNIs may be translated to a VNI associated with data centers 210-1 and 210-2 (e.g., VNI-10 or VNI-20) between network device 240-1 and network device 240-3. Further, assume that network device 240-1 and network device 240-3 are configured with a VNI mapping to enable translation of VNIs in the control plane when route updates are generated. For example, network device 240-1 may be configured with a VNI mapping to enable translation of VNI-10 to VNI-20 in a route update associated with host server 220-1. Network device 240-3 may be configured with a VNI mapping to enable translation of VNI-20 to VNI-10 in a route update associated with host server 220-2. The VNI mapping may also be used to translate VNIs in the data plane.

As shown in FIG. 5D, NVE 230-1 may generate a route update 560 for an address associated with host server 220-1 (e.g., H1-MAC) of data center 210-1. Route update 560 may include a VNI of VNI-10, a route target value of RT-10, and a next hop address of NVE1-IP-local (e.g., a private address of NVE 230-1). As further shown in FIG. 5D, NVE 230-1 may provide route update 560 to network device 240-1, and network device 240-1 may receive route update 510. Network device 240-1 may perform a translation 570 of information provided in route update 560. For example, network device 240-1 may translate the VNI (e.g., VN-10) to a VNI (e.g., VNI-20) associated with data center 210-2; may translate the route target value (e.g., RT-10) to a route target value (e.g., RT-20) associated with data center 210-2; and may translate the next hop address (e.g., NVE1-IP-local) to another IP address (e.g., NVE1-IP2).

As shown in FIG. 5E, after translation 570 of the information provided in route update 560, network device 240-1 may generate an advertisement 580 based on the translated route update 560. Advertisement 580 may include the address associated with host server 220-1 (e.g., H1-MAC), the VNI (e.g., VNI-20) associated with data center 210-2, the route target value (e.g., RT-20) associated with data center 210-2, and the translated next hop address (e.g., NVE1-IP2). As further shown in FIG. 5E, network device 240-1 may provide advertisement 580 (e.g., may advertise the translated route update) to network device 240-3. Network device 240-3 may receive advertisement 580, and may perform a translation 590 of information provided in advertisement 580. For example, network device 240-3 may translate the translated next hop address (e.g., NVE1-IP2) to the next hop address (e.g., NVE1-IP-local) associated with NVE 230-1. In this example, network device 240-3 need not translate the VNI and the route target value since the VNI and the route target value are in a format compatible with data center 210-2.

As shown in FIG. 5F, after translation 590 of the information provided in advertisement 580, network device 240-3 may generate an advertisement 595 based on the translated advertisement 580, and may store advertisement 595. Advertisement 595 may include the address associated with host server 220-1 (e.g., H1-MAC), the VNI (e.g., VNI-20) associated with data center 210-2, the route target value (e.g., RT-20) associated with data center 210-2, and the next hop address (e.g., NVE1-IP-local) associated with NVE 230-1. As further shown in FIG. 5F, network device 240-3 may provide advertisement 595 (e.g., may advertise the translated route update) to NVE 230-3 and/or NVE 230-4 of data center 210-2, and NVE 230-3 and/or NVE 230-4 may store advertisement 595.

As indicated above, FIGS. 5A-5F are provided merely as examples. Other examples are possible and may differ from what was described with regard to FIGS. 5A-5F.

Figure 6:
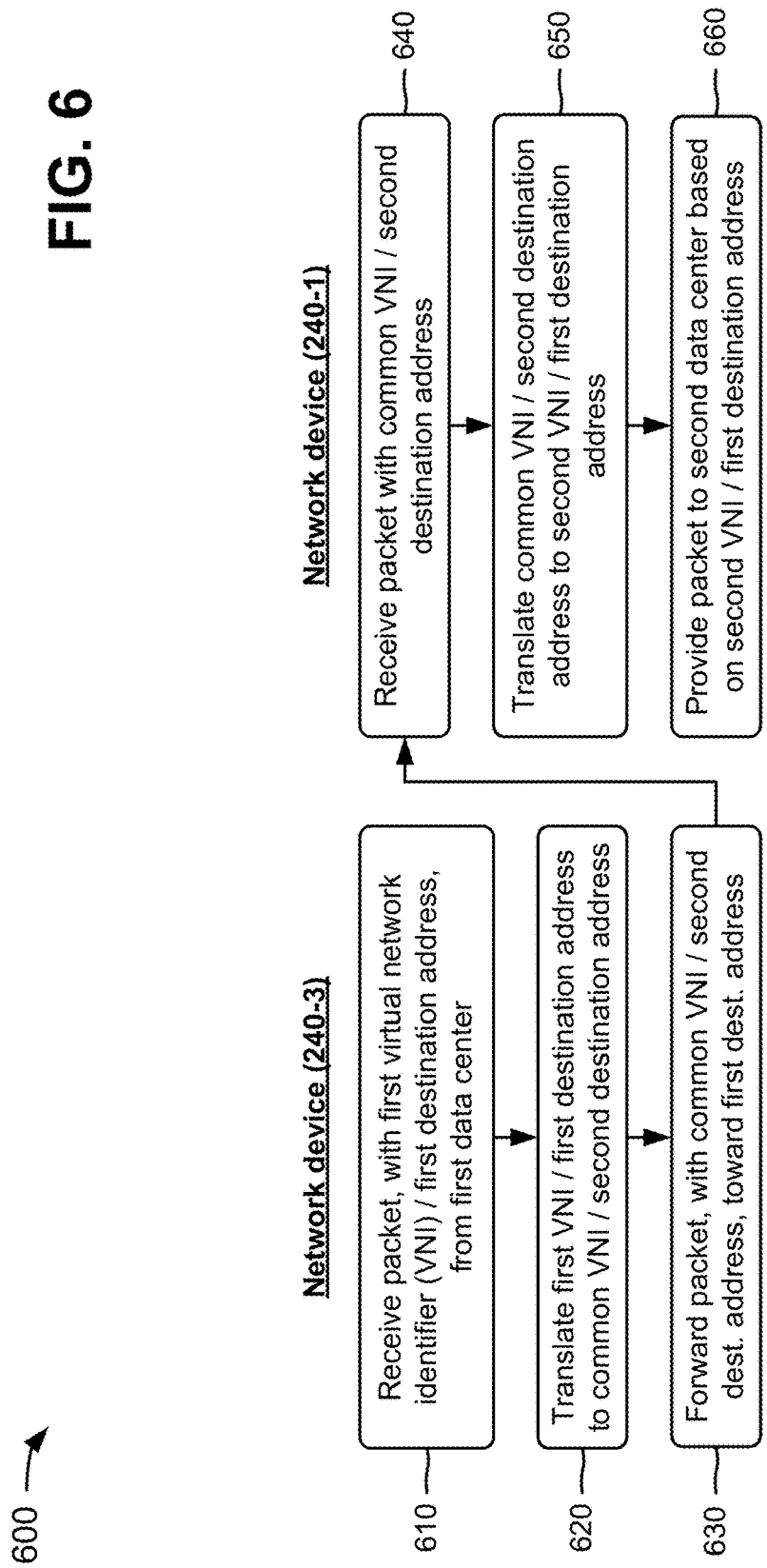
FIG. 6 is a flow chart of an example process for forwarding a packet between two different data centers via network devices.

FIG. 6 is a flow chart of an example process 600 for forwarding a packet between two different data centers via network devices. In some implementations, one or more process blocks of FIG. 6 may be performed by network device 240. In some implementations, one or more process blocks of FIG. 6 may be performed by another device or a group of devices separate from or including network device 240, such as NVE 230. In some implementations, process 600 may include data plane procedures associated with environment 200. Although FIG. 6 is described in connection with network device 240-1 and network device 240-3, process 600 may be performed by any combination of network devices 240-1 through 240-4.

As shown in FIG. 6, process 600 may include receiving a packet, with a first virtual network identifier (VNI) and a first destination address, from a first data center (block 610). For example, network device 240-3 may receive, from data center 210-2, a packet that is destined for data center 210-1. In some implementations, if host server 220-2 of data center 210-2 is to communicate with host server 220-1 of data center 210-1, host server 220-2 may generate the packet, and may provide the packet to NVE 230-3. In some implementations, NVE 230-3 may perform a lookup (e.g., a MAC address lookup) for an address associated with host server 220-1, and may encapsulate (e.g., provide a header for) the packet with a tunnel endpoint address of NVE 230-1 (e.g., NVE1-IP-local or NVE1-IP-public, depending on the control plane setup described above).

In some implementations, network device 240-3 may receive the packet from NVE 230-3. In some implementations, the packet may include a header with an address (e.g., a MAC address) associated host server 220-1 (e.g., H1-MAC). In some implementations, the header of the packet may include a particular VNI associated with a bridge domain (e.g., NVE 230-3) of data center 210-2 and a next hop address (e.g., an IP address of NVE 230-1). For example, assume that the particular VNI is VNI-20 for data center 210-2, and that the next hop address is NVE1-IP-local (if NVE 230-1 includes a private address) or NVE1-IP-public (if NVE 230-1 includes a public address).

As further shown in FIG. 6, process 600 may include translating the first VNI and the first destination address to a common VNI and a second destination address (block 620). For example, network device 240-3 may translate the first VNI to a common or global VNI, and may translate the first destination address to a second destination address.

In some implementations, a downstream assigned VNI may be utilized between network devices 240 (e.g., between network device 240-1 and network device 240-3). In such implementations, operators of data center 210-1 and data center 210-2 may agree on a route target value used to import and/or export traffic at network devices 240. For example, the downstream assigned VNI associated with network device 240-1 may include a VNI associated with data center 210-1 (e.g., VNI-10), and the downstream assigned VNI associated with network device 240-3 may include a VNI associated with data center 210-2 (e.g., VNI-20). In such an example, network device 240-3 may translate the particular VNI (e.g., VNI-20) to the downstream assigned VNI (e.g., VNI-10).

In some implementations, if NVE 230-1 includes a private address, network device 240-3 may translate the private next hop address (e.g., NVE1-IP-local) to another address (e.g., NVE1-IP2) in order to protect the private next hop address. Alternatively, if NVE 230-1 includes a public next hop address (e.g., NVE1-IP-public), network device 240-3 may not translate the next hop address. In some implementations, the VNI translation and the translation of the next hop address may be independent of each other. For example, while the VNI translation may be required, the next hop address translation may be optional, as described above.

As further shown in FIG. 6, process 600 may include forwarding the packet, with the common VNI and the second destination address, toward the first destination address (block 630). For example, network device 240-3 may forward the packet toward a next hop of NVE 230-1, which may be network device 240-1. In some implementations, the header of the packet may include the address of host server 220-1 (e.g., H1-MAC), the common VNI (e.g., VNI-100), and the next hop address (e.g., NVE1-IP2 if the address of NVE 230-1 is private and translated). In some implementations, if the address of NVE 230-1 is public, the next hop address may include the public address (e.g., NVE1-IP-public). In some implementations, if the downstream assigned VNI is utilized between network devices 240, the header of the packet may include the downstream assigned VNI (e.g., VNI-20) instead of the common VNI (e.g., VNI-100).

As further shown in FIG. 6, process 600 may include receiving the packet with the common VNI and the second destination address (block 640). For example, network device 240-1 may receive the packet from network device 240-3. In some implementations, network device 240-1 may receive the packet from network device 240-3, via network 250. In some implementations, the header of the packet may include the address of host server 220-1 (e.g., H1-MAC); the common VNI (e.g., VNI-100) or the downstream assigned VNI (e.g., VNI-20); and the next hop address (e.g., NVE1-IP2 if the address of NVE 230-1 is private and translated).

As further shown in FIG. 6, process 600 may include translating the common VNI and the second destination address, of the packet, to a second VNI and the first destination address (block 650). For example, network device 240-1 may translate the common VNI (e.g., VNI-100) of the header of the packet to a second VNI (e.g., VNI-10) that is compatible with data center 210-1. In some implementations, if the header of the packet includes the downstream assigned VNI (e.g., VNI-20), network device 240-1 may translate the downstream assigned VNI (e.g., VNI-20) to the second VNI (e.g., VNI-10) that is compatible with data center 210-1.

In some implementations, if NVE 230-1 includes a private address and the header of the packet includes the next hop address (e.g., NVE1-IP2), network device 240-1 may translate the next hop address (e.g., NVE1-IP2) to the private next hop address (e.g., NVE1-IP-local). Alternatively, if NVE 230-1 includes a public next hop address (e.g., NVE1-IP-public), network device 240-1 may not translate and may utilize the public next hop address.

As further shown in FIG. 6, process 600 may include providing the packet to a second data center based on the second VNI and the first destination address (block 660). For example, network device 240-1 may provide the packet to data center 210-1, such as to NVE 230-1 of data center 210-1. In some implementations, the header of the packet may include the address of host server 220-1 (e.g., H1-MAC), the second VNI (e.g., VNI-10), and the next hop address (e.g., NVE1-IP-local or NVE1-IP-public). In some implementations, NVE 230-1 may receive the packet, and may determine that the packet is to be provided to host server 220-1 based on the header of the packet (e.g., based on the address of host server 220-1). NVE 230-1 may forward the packet to host server 220-1, and host server 220-1 may receive the packet. In some implementations, host server 220-1 may respond to the packet, may perform a function requested by the packet, may store the packet, or the like.

In some implementations, if the common VNI is utilized, network devices 240 need not maintain end routes associated with host servers 220 in memory (e.g., in a forwarding information base). Network devices 240 at each end of data centers 210 may perform the translation of the VNI and the optional translation of an address of a destination NVE 230, and may forward the packet. In some implementations, to handle broadcast, unknown unicast and multicast (BUM) traffic, NVEs 230 may utilize replication with a tunnel endpoint set as network devices 240. In such implementations, if a service virtual machine (VM) is utilized, each network device 240 may include a service VM for the replication of the BUM traffic. In some implementations, network device 240 may not maintain routes (e.g., MAC routes) from remote data centers 210 in memory (e.g., in a forwarding information base), and may not perform route lookup for addresses not associated with a local data center 210.

In some implementations, programming of the forwarding layer may depend upon a next hop used in route update messages by a local network device 240. For example, if the local network device 240 rewrites the next hop to be the local network device 240, then a tunnel from a remote NVE 230 may terminate at the local network device 240. The local network device 240 may perform a route lookup to forward a packet, but may not maintain remote routes of remote data centers in a forwarding information base. In another example, if a route lookup on the local network device 240 is not desired, then NVE 230 may use a public address or a private address that is translated to another address by network device 240 and used as a next hop address in an advertisement. A remote network device 240 may translate an incoming next hop address, provided in a route update message, to another IP address before providing the route update message to a remote NVE 230.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7F are diagrams of an example implementation 700 relating to example process 600 shown in FIG. 6. FIGS. 7A-7F show examples of data plane procedures associated with network devices 240.

Figure 7B:
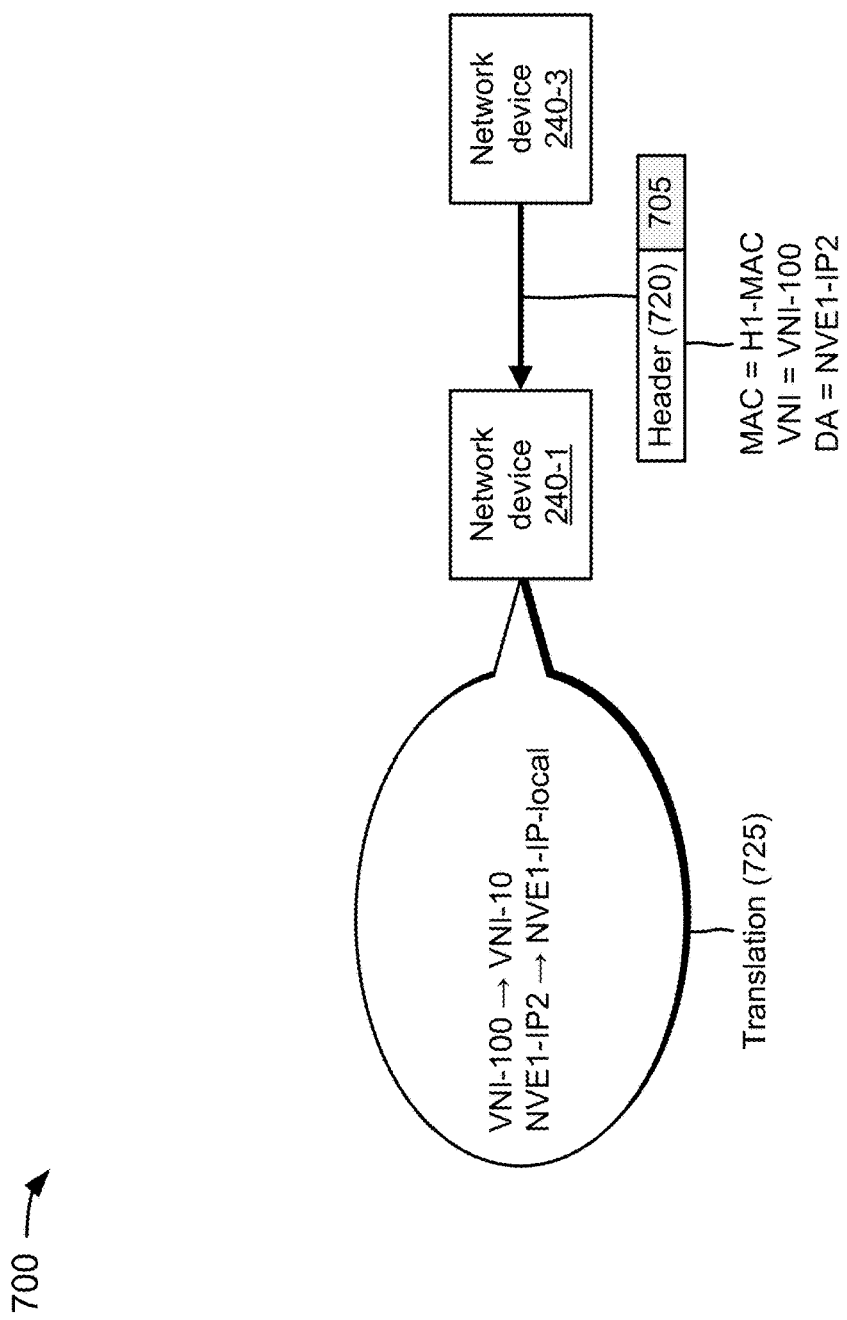
Figure 7C:
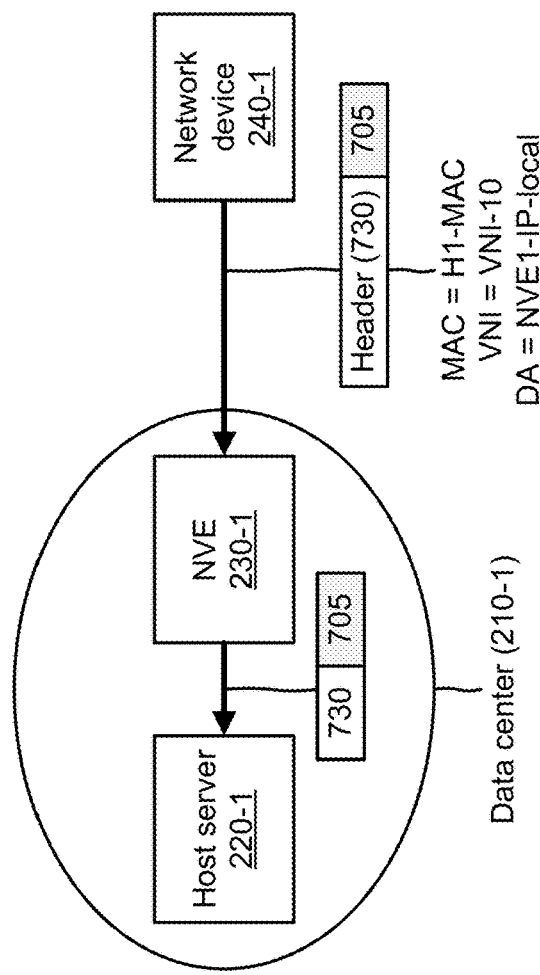

FIGS. 7A-7C show an example of data plane procedures when a common VNI is used for the data center interconnection and network devices 240 do not perform route lookup. In the example of FIGS. 7A-7C, assume that bridge domains are represented with different VNIs in each data center 210 (e.g., VNI-10 in data center 210-1 and VNI-20 in data center 210-2), and that the VNIs may be translated to a common VNI (e.g., VNI-100) between network device 240-1 and network device 240-3. Further, assume that network device 240-1 and network device 240-3 are configured with a VNI mapping to enable translation of VNIs in the data plane when packets are forwarded. For example, network device 240-1 may be configured with a VNI mapping to enable translation of VNI-10 to VNI-100 in a header of a packet associated with host server 220-1. Network device 240-3 may be configured with a VNI mapping to enable translation of VNI-20 to VNI-100 in a header of a packet associated with host server 220-2.

As shown in FIG. 7A, host server 220-2 of data center 210-2 may generate a packet 705 that is destined for host server 220-1 of data center 210-1, and may provide packet 705 to NVE 230-3. NVE 230-3 may perform a lookup for an address associated with host server 220-1 (e.g., H1-MAC), and may encapsulate packet 705 with a header 710 based on the lookup. Header 710 may include the address associated with host server 220-1 (e.g., H1-MAC), a VNI (e.g., VNI-20) associated with data center 210-2, and a destination address (DA) (e.g., NVE1-IP-local, a private address) associated with NVE 230-1. As further shown in FIG. 7A, NVE 230-3 may provide packet 705 and header 710 to network device 240-3, provided at an edge of data center 210-2. Network device 240-3 may receive packet 705 and header 710, and may perform a translation 715 of information provided in header 710. For example, network device 240-3 may translate the VNI (e.g., VN-20) to the common VNI (e.g., VNI-100), and may translate the destination address (e.g., NVE1-IP-local) to another IP address (e.g., NVE1-IP2).

As shown in FIG. 7B, after translation 715 of the information provided in header 710, network device 240-3 may generate a translated header 720 based on the translated information provided in header 710. Translated header 720 may include the address associated with host server 220-1 (e.g., H1-MAC), the common VNI (e.g., VNI-100), and the translated destination address (e.g., NVE1-IP2). As further shown in FIG. 7B, network device 240-3 may provide packet 705 and translated header 720 to network device 240-1. Network device 240-1 may receive packet 705 and translated header 720, and may perform a translation 725 of information provided in translated header 720. For example, network device 240-1 may translate the common VNI (e.g., VN-100) to a VNI (e.g., VNI-10) associated with data center 210-1, and may translate the translated destination address (e.g., NVE1-IP2) to the destination address (e.g., NVE1-IP-local) associated with NVE 230-1.

As shown in FIG. 7C, after translation 725 of the information provided in translated header 720, network device 240-1 may generate another header 730 based on the translation of translated header 720. Header 730 may include the address associated with host server 220-1 (e.g., H1-MAC), the VNI (e.g., VNI-10) associated with data center 210-1, and the destination address (e.g., NVE1-IP-local) associated with NVE 230-1. As further shown in FIG. 7C, network device 240-1 may provide packet 705 and header 730 to NVE 230-1 of data center 210-1, and NVE 230-1 may provide packet 705 and header 730 to host server 220-1.

Figure 7D:
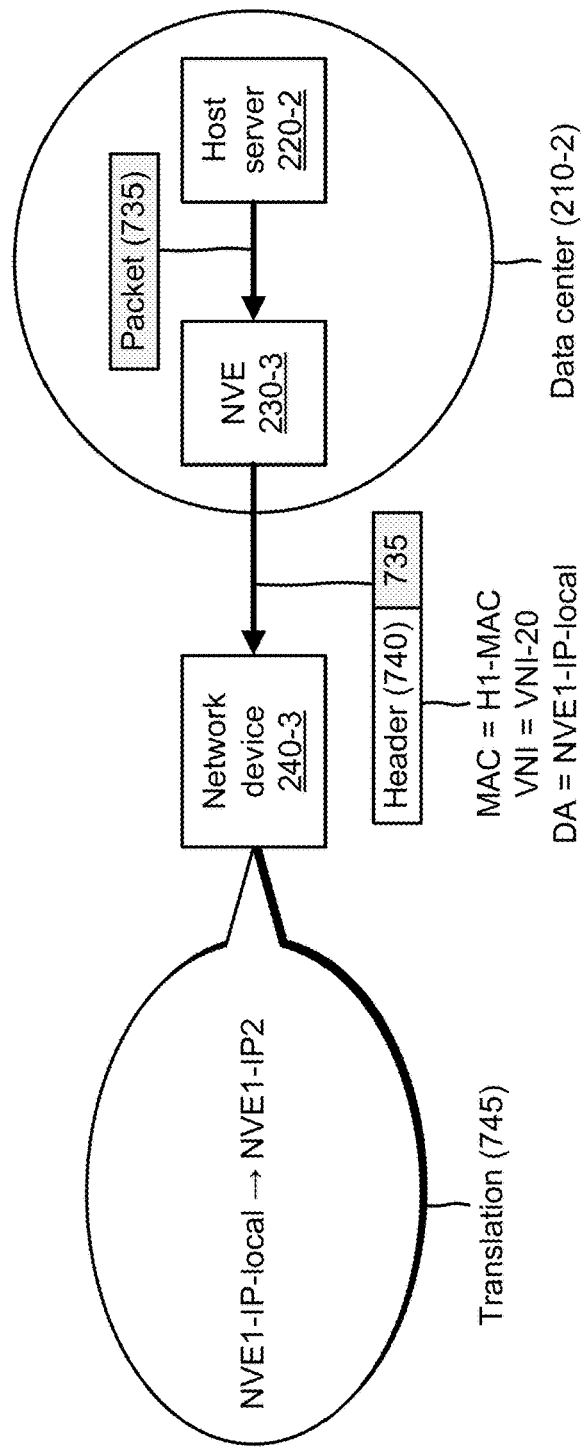
Figure 7F:
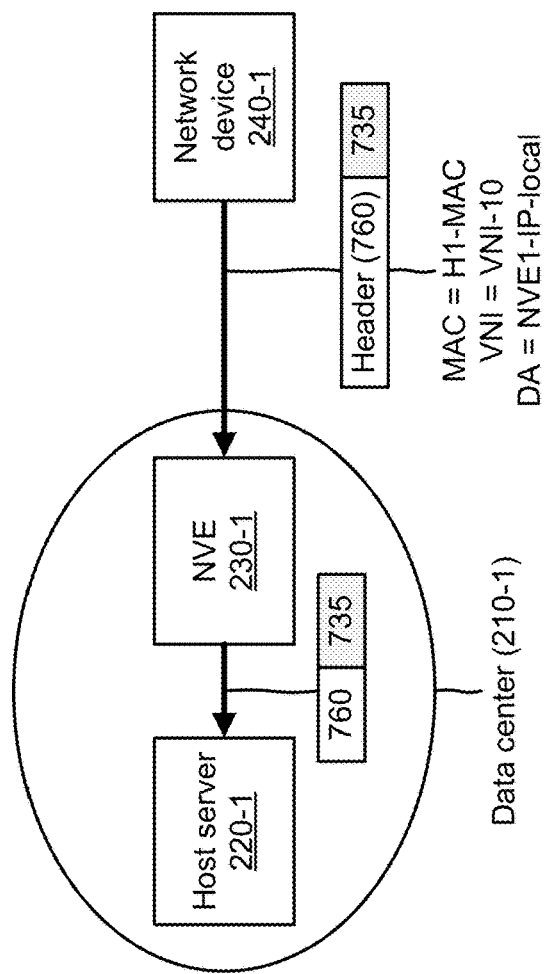

FIGS. 7D-7F show an example of data plane procedures when a downstream assigned VNI is used for the data center interconnection and network devices 240 do not perform route lookup. In the example of FIGS. 7D-7F, assume that bridge domains are represented with different VNIs in each data center 210 (e.g., VNI-10 in data center 210-1 and VNI-20 in data center 210-2), and that the VNIs may be translated to a VNI associated with data centers 210-1 and 210-2 (e.g., VNI-10 or VNI-20) between network device 240-1 and network device 240-3. Further, assume that network device 240-1 and network device 240-3 are configured with a VNI mapping to enable translation of VNIs in the data plane when packets are generated. For example, network device 240-1 may be configured with a VNI mapping to enable translation of VNI-10 to VNI-20 in a header of a packet associated with host server 220-1. Network device 240-3 may be configured with a VNI mapping to enable translation of VNI-20 to VNI-10 in a header of a packet associated with host server 220-2.

As shown in FIG. 7D, host server 220-2 of data center 210-2 may generate a packet 735 that is destined for host server 220-1 of data center 210-1, and may provide packet 735 to NVE 230-3. NVE 230-3 may perform a lookup for an address associated with host server 220-1 (e.g., H1-MAC), and may encapsulate packet 735 with a header 740 based on the lookup. Header 740 may include the address associated with host server 220-1 (e.g., H1-MAC), a VNI (e.g., VNI-20) associated with data center 210-2, and a destination address (e.g., NVE1-IP-local) associated with NVE 230-1. As further shown in FIG. 7D, NVE 230-3 may provide packet 735 and header 740 to network device 240-3, provided at an edge of data center 210-2. Network device 240-3 may receive packet 735 and header 740, and may perform a translation 745 of information provided in header 740. For example, network device 240-3 may not translate the VNI (e.g., VN-20), but may translate the destination address (e.g., NVE1-IP-local) to another IP address (e.g., NVE1-IP2).

As shown in FIG. 7E, after translation 745 of the information provided in header 740, network device 240-3 may generate a translated header 750 based on the translated information provided in header 740. Translated header 750 may include the address associated with host server 220-1 (e.g., H1-MAC), the VNI (e.g., VNI-20) associated with data center 210-2, and the translated destination address (e.g., NVE1-IP2). As further shown in FIG. 7E, network device 240-3 may provide packet 735 and translated header 750 to network device 240-1. Network device 240-1 may receive packet 735 and translated header 750, and may perform a translation 755 of information provided in translated header 750. For example, network device 240-1 may translate the VNI (e.g., VN-20) to a VNI (e.g., VNI-10) associated with data center 210-1, and may translate the translated destination address (e.g., NVE1-IP2) to the destination address (e.g., NVE1-IP-local) associated with NVE 230-1.

As shown in FIG. 7F, after translation 755 of the information provided in translated header 750, network device 240-1 may generate another header 760 based on the translation of translated header 750. Header 760 may include the address associated with host server 220-1 (e.g., H1-MAC), the VNI (e.g., VNI-10) associated with data center 210-1, and the destination address (e.g., NVE1-IP-local) associated with NVE 230-1. As further shown in FIG. 7F, network device 240-1 may provide packet 735 and header 760 to NVE 230-1 of data center 210-1, and NVE 230-1 may provide packet 735 and header 760 to host server 220-1.

As indicated above, FIGS. 7A-7F are provided merely as an example. Other examples are possible and may differ from what was described with regard to FIGS. 7A-7F.

Figure 8A:
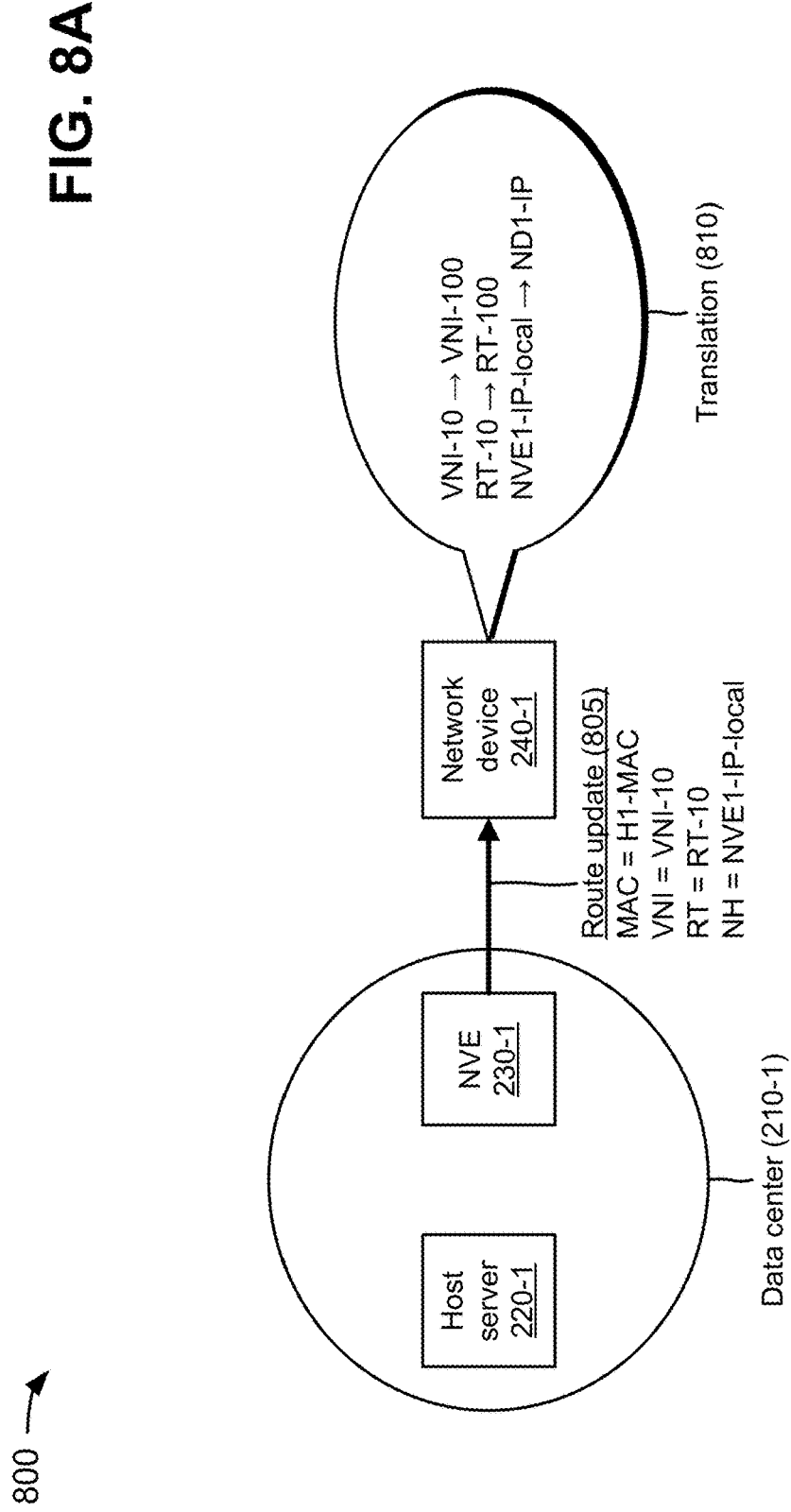
Figure 8C:
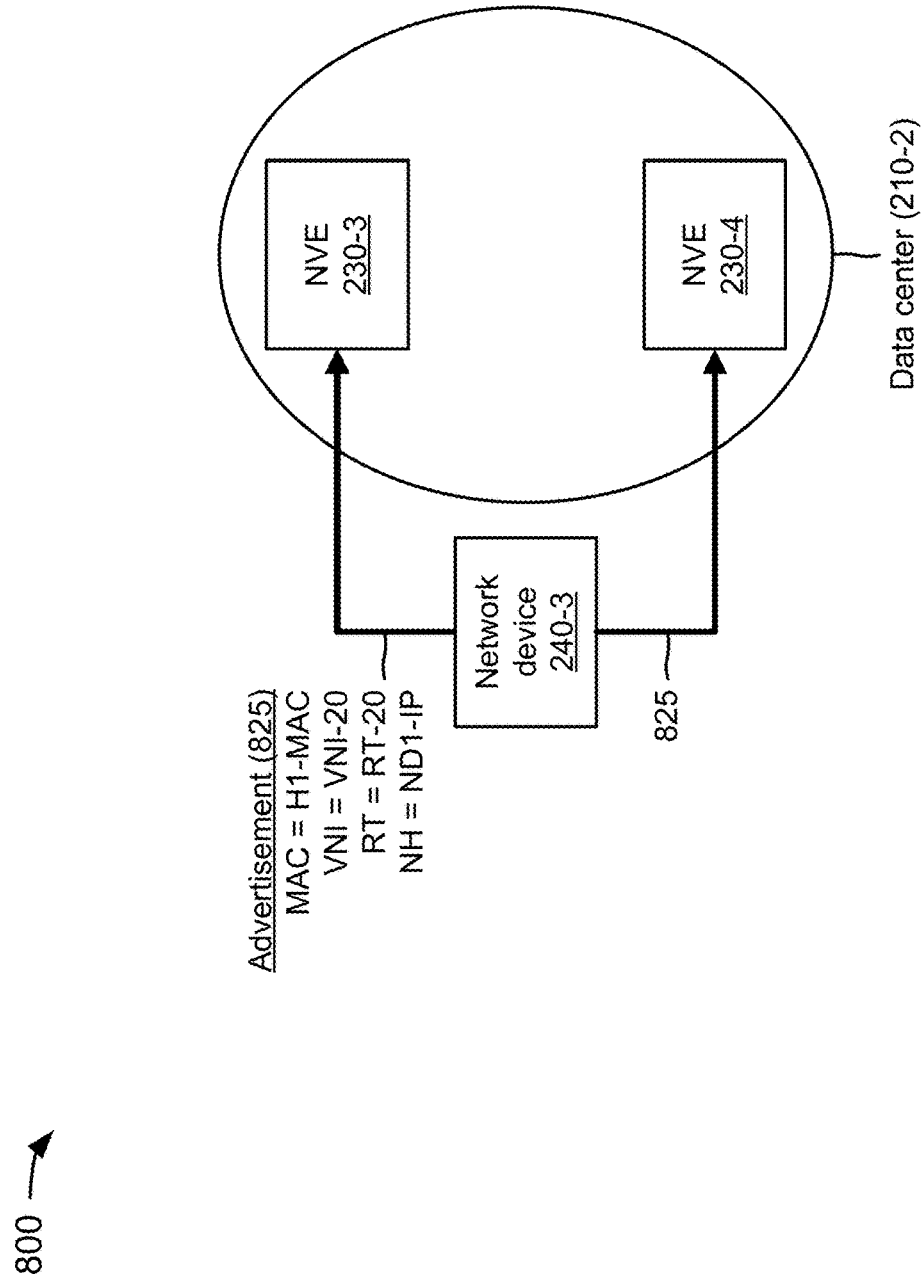
Figure 8D:
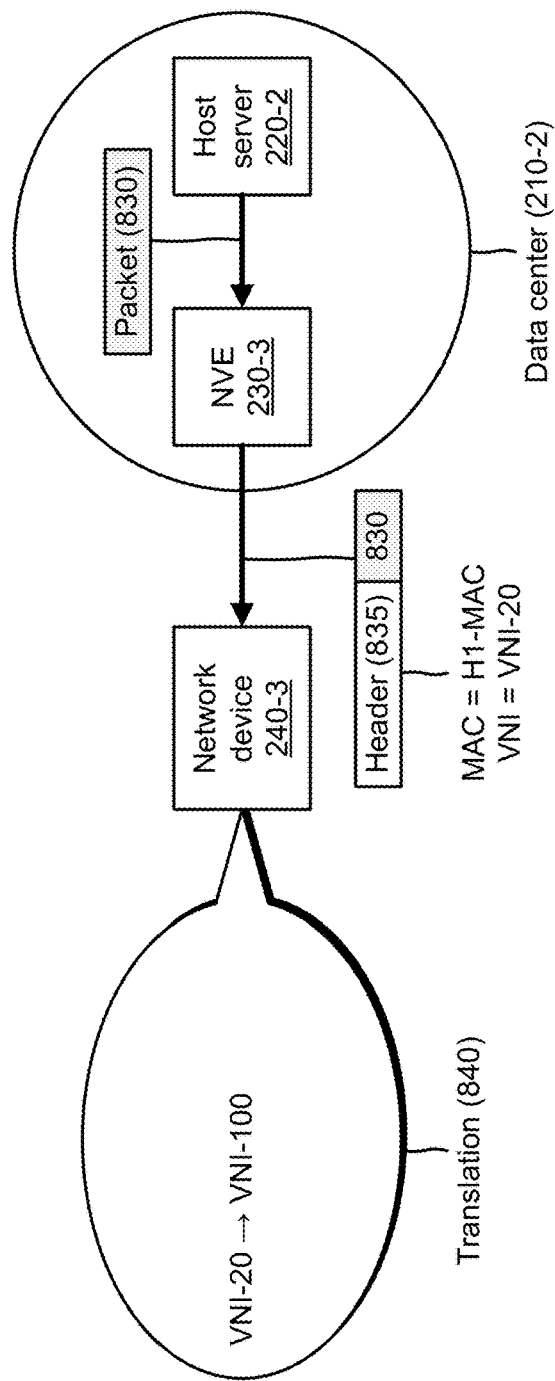
Figure 8F:
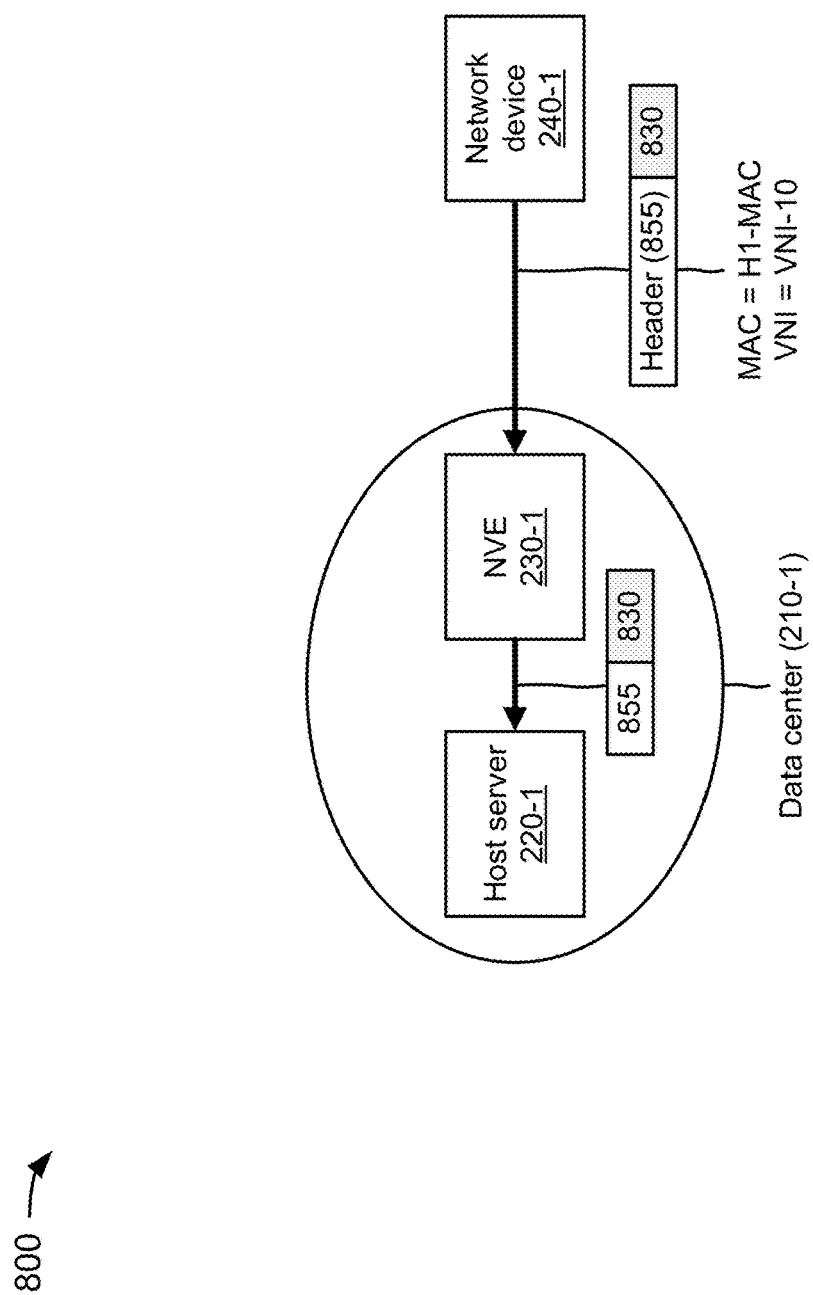

FIGS. 8A-8F are diagrams of example alternative implementations 800 relating to example process 400 shown in FIG. 4 and example process 600 shown in FIG. 6. FIGS. 8A-8C show an alternative example of setting up a control plane associated with network devices 240. FIGS. 8D-8F show an alternative example of data plane procedures associated with network devices 240. In FIGS. 8A-8F, a particular network device 240 may rewrite a next hop in route update messages to the particular network device 240 when forwarding the messages further to a remote network device 240. Hence, a tunnel originated in a remote data center 210 may terminate at the particular network device 240 that performs a lookup for host servers 220 in a local data center 210. The alternative implementations may only require VNI translation in the control and the data plane. In the alternative implementations, the particular network device 240 may maintain a complete forwarding information base of local routes within a local data center 210 but may not maintain remote routes within remote data centers 210.

FIGS. 8A-8C show an example of setting up a control plane when a common VNI is used for the data center interconnection, and network devices 240 are set up as next hops and perform route lookup. In the example of FIGS. 8A-8C, assume that bridge domains are represented with different VNIs in each data center 210 (e.g., VNI-10 in data center 210-1 and VNI-20 in data center 210-2), and that the VNIs may be translated to a common VNI (e.g., VNI-100) between network device 240-1 and network device 240-3. Further, assume that network device 240-1 and network device 240-3 are configured with a VNI mapping to enable translation of VNIs in the control plane when route updates are generated.

As shown in FIG. 8A, NVE 230-1 may generate a route update 805 for an address associated with host server 220-1 (e.g., H1-MAC) of data center 210-1. Route update 805 may include a VNI of VNI-10, a route target value of RT-10, and a next hop address of NVE1-IP-local (e.g., a private address of NVE 230-1). As further shown in FIG. 8A, NVE 230-1 may provide route update 805 to network device 240-1. Network device 240-1 may receive route update 805, and may perform a translation 810 of information provided in route update 805. For example, network device 240-1 may translate the VNI (e.g., VN-10) to the common VNI (e.g., VNI-100); may translate the route target value (e.g., RT-10) to a common route target value (e.g., RT-100) derived from the common VNI; and may rewrite the next hop address (e.g., NVE1-IP-local) to an address (e.g., ND1-IP) associated with network device 240-1.

As shown in FIG. 8B, after translation 810 of the information provided in route update 805, network device 240-1 may generate an advertisement 815 based on the translated route update 805. Advertisement 815 may include the address associated with host server 220-1 (e.g., H1-MAC), the common VNI (e.g., VNI-100), the common route target value (e.g., RT-100), and the next hop address (e.g., ND1-IP) associated with network device 240-1. As further shown in FIG. 8B, network device 240-1 may provide advertisement 815 (e.g., may advertise the translated route update) to network device 240-3. Network device 240-3 may receive advertisement 815, and may perform a translation 820 of information provided in advertisement 815. For example, network device 240-3 may translate the common VNI (e.g., VN-100) to a VNI (e.g., VNI-20) associated with data center 210-2, and may translate the common route target value (e.g., RT-100) to a route target value (e.g., RT-20) associated with data center 210-2. Network device 240-3 may not translate the next hop address (e.g., ND1-IP).

As shown in FIG. 8C, after translation 820 of the information provided in advertisement 815, network device 240-3 may generate an advertisement 825 based on the translated advertisement 815, and may store advertisement 825. Advertisement 825 may include the address associated with host server 220-1 (e.g., H1-MAC), the VNI (e.g., VNI-20) associated with data center 210-2, the route target value (e.g., RT-20) associated with data center 210-2, and the next hop address (e.g., ND1-IP) associated with network device 240-1. As further shown in FIG. 8C, network device 240-3 may provide advertisement 825 (e.g., may advertise the translated route update) to NVE 230-3 and/or NVE 230-4 of data center 210-2, and NVE 230-3 and/or NVE 230-4 may store advertisement 825.

FIGS. 8D-8F show an example of data plane procedures when a common VNI is used for the data center interconnection, and network devices 240 are set up as next hops and perform route lookup. In the example of FIGS. 8D-8F, assume that bridge domains are represented with different VNIs in each data center 210 (e.g., VNI-10 in data center 210-1 and VNI-20 in data center 210-2), and that the VNIs may be translated to a common VNI (e.g., VNI-100) between network device 240-1 and network device 240-3. Further, assume that network device 240-1 and network device 240-3 are configured with a VNI mapping to enable translation of VNIs in the data plane when packets are forwarded.

As shown in FIG. 8D, host server 220-2 of data center 210-2 may generate a packet 830 that is destined for host server 220-1 of data center 210-1, and may provide packet 830 to NVE 230-3. NVE 230-3 may perform a lookup for an address associated with host server 220-1 (e.g., H1-MAC), and may encapsulate packet 830 with a header 835 based on the lookup. Header 835 may include the address associated with host server 220-1 (e.g., H1-MAC), and a VNI (e.g., VNI-20) associated with data center 210-1. NVE 230-3 may provide packet 830 and header 835 over a VXLAN tunnel, with a tunnel endpoint set to network device 240-1, and via network device 240-3. Network device 240-3 may receive packet 830 and header 835, and may perform a translation 840 of information provided in header 835. For example, network device 240-3 may translate the VNI (e.g., VN-20) to the common VNI (e.g., VNI-100), before forwarding packet 830 to network device 240-1.

As shown in FIG. 8E, after translation 840 of the information provided in header 835, network device 240-3 may generate a translated header 845 based on the translated information provided in header 835. Translated header 845 may include the address associated with host server 220-1 (e.g., H1-MAC) and the common VNI (e.g., VNI-100). As further shown in FIG. 8E, network device 240-3 may provide packet 835 and translated header 845 to network device 240-1 (e.g., since the VXLAN tunnel terminates on network device 240-1). Network device 240-1 may receive packet 835 and translated header 845, and may perform a translation 850 of information provided in translated header 845. For example, network device 240-1 may translate the common VNI (e.g., VN-100) to a VNI (e.g., VNI-10) associated with data center 210-1.

As shown in FIG. 8F, after translation 850 of the information provided in translated header 845, network device 240-1 may generate another header 855 based on the translation of translated header 845. Header 730 may include the address associated with host server 220-1 (e.g., H1-MAC) and the VNI (e.g., VNI-10) associated with data center 210-1. Network device 240-1 may perform a layer 2 lookup on packet 830 and may forward packet 830 to NVE 230-1 based on the lookup. As further shown in FIG. 8F, network device 240-1 may provide packet 830 and header 855 to NVE 230-1 of data center 210-1, and NVE 230-1 may provide packet 830 and header 855 to host server 220-1.

As indicated above, FIGS. 8A-8F are provided merely as an example. Other examples are possible and may differ from what was described with regard to FIGS. 8A-8F.

Systems and/or methods, described herein, may enable different data centers to interconnect when identifiers (e.g., VNIs) are unique within the data centers. The systems and/or methods may enable devices with limited resources (e.g., NVEs), within a data center, to manage a single VNI space of the data center, and may enable devices with more resources (e.g., network devices at the edge of the data center network) to manage complex information associated with multiple VNI spaces.

The foregoing disclosure provides illustration and description, but is not intended to be exhaustive or to limit the implementations to the precise form disclosed. Modifications and variations are possible in light of the above disclosure or may be acquired from practice of the implementations. For example, while the systems and/or methods, described herein, are described in the context of data centers for simplicity, these systems and/or methods may equally apply in the context of portions of data centers, such as modules of data centers (e.g., performance optimized data centers), or private networks.

As used herein, the term component is intended to be broadly construed as hardware, firmware, and/or a combination of hardware and software.

As used herein, a packet may refer to a network packet, a frame, a datagram, a segment, a fragment of a network packet, a fragment of a frame, a fragment of a datagram, a fragment of a segment, or any other formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   a memory; and
   one or more processors to:
     receive, from a first network virtualization edge of a first data center, a route update that includes a first virtual network identifier associated with the first network virtualization edge, a route target value that is compatible with the first data center, and a next hop address of the first network virtualization edge,
       the route target value including information used to tag prefixes and to inform provider edge routers which prefixes can be imported, and
       the first data center being operated by a first operator;
     translate the first virtual network identifier to a common virtual network identifier,
       the common virtual network identifier being agreed upon by the first operator and a second operator of a second data center,
       the second data center being different than the first data center, and
       the second operator being different than the first operator;
     translate the route target value to a common route target value;
     determine that the next hop address of the first network virtualization edge is private;
     translate the next hop address of the first network virtualization edge to a different next hop address based on determining that the next hop address of the first network virtualization edge is private;
     generate an advertisement of the route update based on the common virtual network identifier, the common route target value, and the different next hop address; and
     provide the advertisement of the route update, with the common virtual network identifier, the common route target value, and the different next hop address, to another network device associated with the second data center.

2. The network device of claim 1, where the one or more processors are further to:
   receive a packet with the common virtual network identifier or a second virtual network identifier associated with a second network virtualization edge of the second data center;
   translate the common virtual network identifier or the second virtual network identifier to the first virtual network identifier; and
   provide the packet to the first data center based on the first virtual network identifier.

3. The network device of claim 2,
   where the packet includes a destination address,
   where the destination address is the next hop address of the first network virtualization edge, and
   where, when providing the packet, the one or more processors are to:
     translate the destination address to the different next hop address; and
     provide the packet to the first data center based on the first virtual network identifier and the different next hop address.

4. A method, comprising:
   receiving, by a network device and from a first network virtualization edge of a first data center, a route update that includes a first virtual network identifier associated with the first network virtualization edge, a route target value that is compatible with the first data center, and a next hop address of the first network virtualization edge,
     the route target value including information used to tag prefixes and to inform provider edge routers which prefixes can be imported, and
     the first data center being managed by a first entity;
   translating, by the network device, the first virtual network identifier to a common virtual network identifier,
     the common virtual network identifier being agreed upon by the first entity and a second entity that manages a second data center,
     the second data center being different than the first data center, and
     the second entity being different than the first entity;
   translating, by the network device, the route target value to a common route target value;
   determining, by the network device, that the next hop address of the first network virtualization edge is private;
   translating, by the network device, the next hop address of the first network virtualization edge to a different next hop address based on determining that the next hop address of the first network virtualization edge is private;
   generating, by the network device, an advertisement of the route update based on the common virtual network identifier, the common route target value, and the different next hop address; and
   providing, by the network device, the advertisement of the route update, with the common virtual network identifier, the common route target value, and the different next hop address, to another network device associated with the second data center.

5. The method of claim 4, further comprising:
   receiving a packet with the common virtual network identifier;
   translating the common virtual network identifier to the first virtual network identifier; and
   providing the packet to the first data center based on the first virtual network identifier.

6. The method of claim 5,
   where the packet includes a destination address,
   where the destination address is the next hop address of the first network virtualization edge, and
   where providing the packet comprises:

translating the destination address to the different next hop address; and providing the packet to the first data center based on the different next hop address.

7. A network device, comprising:
a memory; and
one or more processors to:
receive, from another network device associated with a first network virtualization edge of a first data center, an advertisement of a route update,
the advertisement including a common virtual network identifier, a common route target value, and a next hop address,
a first virtual network identifier being associated with the first network virtualization edge,
the first data center being operated by a first operator,
the common virtual network identifier being agreed upon by the first operator and a second operator of a second data center,
the second operator being different than the first operator;
translate the common virtual network identifier to a second virtual network identifier associated with a second network virtualization edge of the second data center,
the second data center being different than the first data center;
translate the common route target value to a particular route target value that is compatible with the second data center,
the particular route target value including information used to tag prefixes and to inform provider edge routers which prefixes can be imported;
translate the next hop address to a private next hop address after receiving the advertisement; and
provide the advertisement, with the second virtual network identifier, the particular route target value, and the private next hop address, to the second network virtualization edge of the second data center.

8. The network device of claim 7, where the one or more processors are further to:
receive, from the second data center, a packet with the second virtual network identifier;
translate the second virtual network identifier to the common virtual network identifier; and
forward the packet based on the common virtual network identifier.

9. The network device of claim 8,
where the packet includes a private destination address,
where the private destination address is the private next hop address, and
where, when forwarding the packet, the one or more processors are to:
translate the private destination address to the next hop address; and
forward the packet based on the common virtual network identifier and the next hop address.

10. A method, comprising:
receiving, by a network device and from another network device associated with a first network virtualization edge of a first data center, an advertisement of a route update,
the advertisement including a common virtual network identifier, a common route target value, and a next hop address,
a first virtual network identifier being associated with the first data center,
the first data center being operated by a first operator,
the common virtual network identifier being agreed upon by the first operator and a second operator of a second data center,
and
the second operator being different than the first operator;
translating, by the network device, the common virtual network identifier to a second virtual network identifier associated with a second network virtualization edge of the second data center,
the second data center being different than the first data center;
translating, by the network device, the common route target value to a particular route target value that is compatible with the second data center,
the particular route target value including information used to tag prefixes and to inform provider edge routers which prefixes can be imported;
translating, by the network device, the next hop address to a private next hop address after receiving the advertisement; and
providing, by the network device, the advertisement, with the second virtual network identifier, the particular route target value, and the private next hop address, to the second network virtualization edge of the second data center.

11. The method of claim 10, further comprising:
receiving, from the second data center, a packet with the second virtual network identifier;
translating the second virtual network identifier to the common virtual network identifier; and
forwarding the packet based on the common virtual network identifier.

12. The method of claim 10, further comprising:
determining that the first network virtualization edge includes a private address; and
determining that the route update includes the next hop address,
where translating the next hop address to the private next hop address comprises:
translating the next hop address to the private next hop address based on determining that the first network virtualization edge includes the private address and based on determining that the route update includes the next hop address.

13. The method of claim 10, where the advertisement further includes an address of a host server of the first data center.

14. The network device of claim 1,
where the one or more processors are further to:
determine that the next hop address is to be hidden outside of the first data center, and
where, when translating the next hop address to the different next hop address, the one or more processors are to:
translate the next hop address to the different next hop address based on determining that the next hop address of the first network virtualization edge is private and based on determining that the next hop address is to be hidden outside of the first data center.

15. The method of claim 4, further comprising:
determining that the next hop address is to be hidden outside of the first data center,
where translating the next hop address to the different next hop address comprises:

translating the next hop address to the different next hop address based on determining that the next hop address of the first network virtualization edge is private and based on determining that the next hop address is to be hidden outside of the first data center.

16. The network device of claim 7,
where the one or more processors are further to:
   determine that the first network virtualization edge includes a private address; and
   determine that the route update includes the next hop address,
where, when translating the next hop address to the private next hop address, the one or more processors are to:
   translate the next hop address to the private next hop address based on determining that the first network virtualization edge includes the private address and based on determining that the route update includes the next hop address.

17. The network device of claim 7, where the advertisement further includes an address of a host server of the first data center.

18. The network device of claim 1, where the route update is a border gateway protocol (BGP) route update.

19. The method of claim 4, where the route update is a border gateway protocol (BGP) route update.

20. The network device of claim 7, where the route update is a border gateway protocol (BGP) route update.

\* \* \* \* \*